(12) United States Patent
Lee et al.

(10) Patent No.: US 7,126,630 B1
(45) Date of Patent: Oct. 24, 2006

(54) METHOD AND APPARATUS FOR OMNI-DIRECTIONAL IMAGE AND 3-DIMENSIONAL DATA ACQUISITION WITH DATA ANNOTATION AND DYNAMIC RANGE EXTENSION METHOD

(75) Inventors: Kujin Lee, 20430 Via Paviso E32, Cupertino, CA (US) 95014; In So Kweon, Taejon (KR); Howon Kim, Taegu (KR); Junsik Kim, Seoul (KR)

(73) Assignee: Kujin Lee, Cupertino, CA (US)

( * ) Notice: Subject to any disclaimer, the term of this patent is extended or adjusted under 35 U.S.C. 154(b) by 611 days.

(21) Appl. No.: 10/071,915

(22) Filed: Feb. 8, 2002

Related U.S. Application Data

(60) Provisional application No. 60/267,761, filed on Feb. 9, 2001.

(51) Int. Cl.
*H04N 5/225* (2006.01)

(52) U.S. Cl. .................. 348/218.1; 348/47; 348/159; 348/373

(58) Field of Classification Search ............... 396/351, 396/352, 21, 427, 36, 143, 154; 348/48, 348/47, 139, 218.1, 208.12; 382/154
See application file for complete search history.

(56) References Cited

U.S. PATENT DOCUMENTS

| | | | |
|---|---|---|---|
| 5,023,725 A | | 6/1991 | McCutchen |
| 5,745,305 A | * | 4/1998 | Nalwa .................. 359/725 |
| 5,760,826 A | * | 6/1998 | Nayar ................... 348/36 |
| 6,023,588 A | * | 2/2000 | Ray et al. ............... 396/20 |
| 6,057,878 A | * | 5/2000 | Ogiwara et al. ......... 348/56 |
| 6,141,034 A | | 10/2000 | McCutchen |
| 6,323,858 B1 | * | 11/2001 | Gilbert et al. .......... 345/419 |
| 6,335,754 B1 | * | 1/2002 | Endo et al. ............. 348/37 |
| 6,337,683 B1 | * | 1/2002 | Gilbert et al. .......... 345/418 |
| 6,445,814 B1 | * | 9/2002 | Iijima et al. ............ 382/154 |
| 6,498,620 B1 | * | 12/2002 | Schofield et al. ....... 348/148 |
| 2002/0046218 A1 | * | 4/2002 | Gilbert et al. ......... 707/500.1 |
| 2003/0030636 A1 | * | 2/2003 | Yamaoka ............... 345/419 |
| 2005/0207487 A1 | * | 9/2005 | Monroe ................ 375/240.01 |

FOREIGN PATENT DOCUMENTS

JP 8018858 1/1996

OTHER PUBLICATIONS

Specifications of U.S. Appl. No. 09/593,361, filed Jun. 14, 2000.*
Slater, Dan; "A full sphere camera for point of view and VR photography"; Website "http://www.nearfield.com/~dan/photo/wide/sphere/sphere2/index.htm", 1996.
Website "http://www.e-pan.com/index.html".

* cited by examiner

*Primary Examiner*—Tuan Ho
*Assistant Examiner*—Nelson D. Hernandez

(57) ABSTRACT

A method and apparatus for omni-directional image and 3-dimensional data acquisition with data annotation and dynamic rage extension method is capable of omni-directionally photographing, acquiring 3-dimensional images photographed by cameras having each different exposure amount in connection with the direction of height of an object, extending dynamic range, and generating an geographical information by entering an annotation such as photographing location and time into the photographed images, which can be connected with other geographical information system database. The apparatus includes one or more multi camera module(s) which are stacked and formed multi layers in the direction of height for acquiring 3-dimensional images and extending dynamic range of the 3-dimensional images, wherein each multi camera module includes a plurality of cameras symmetrically arranged with a specific point in a plane.

12 Claims, 34 Drawing Sheets

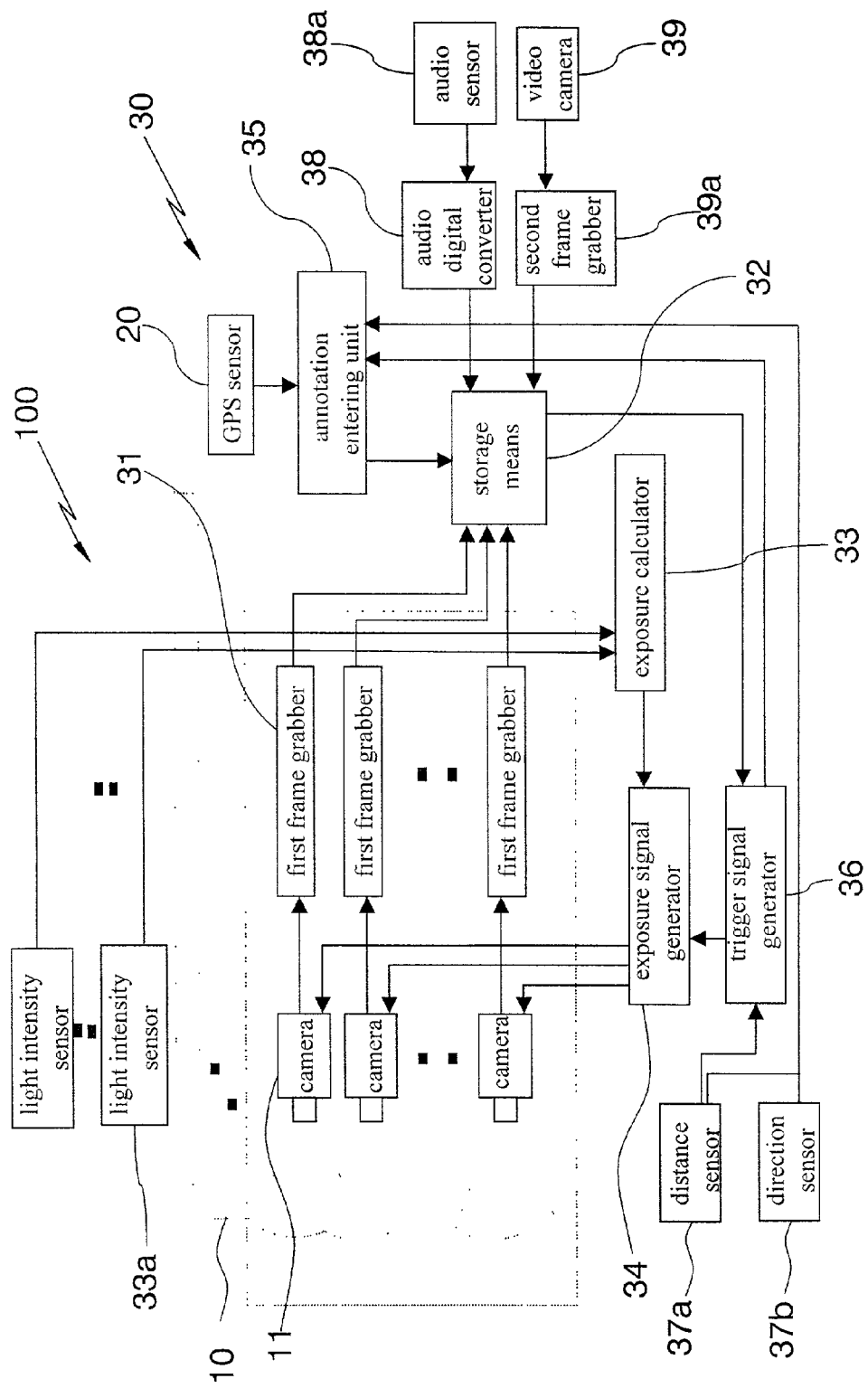

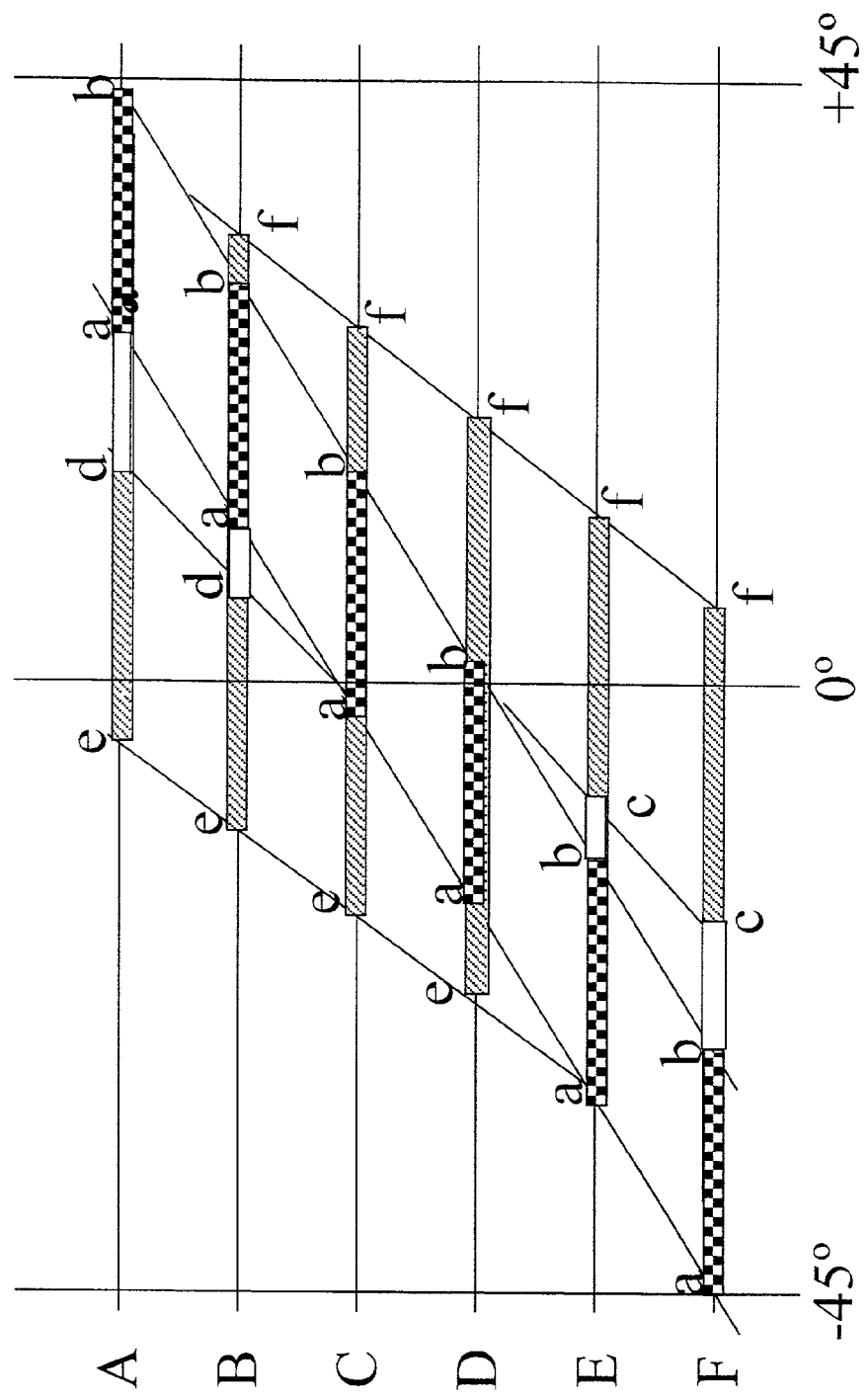

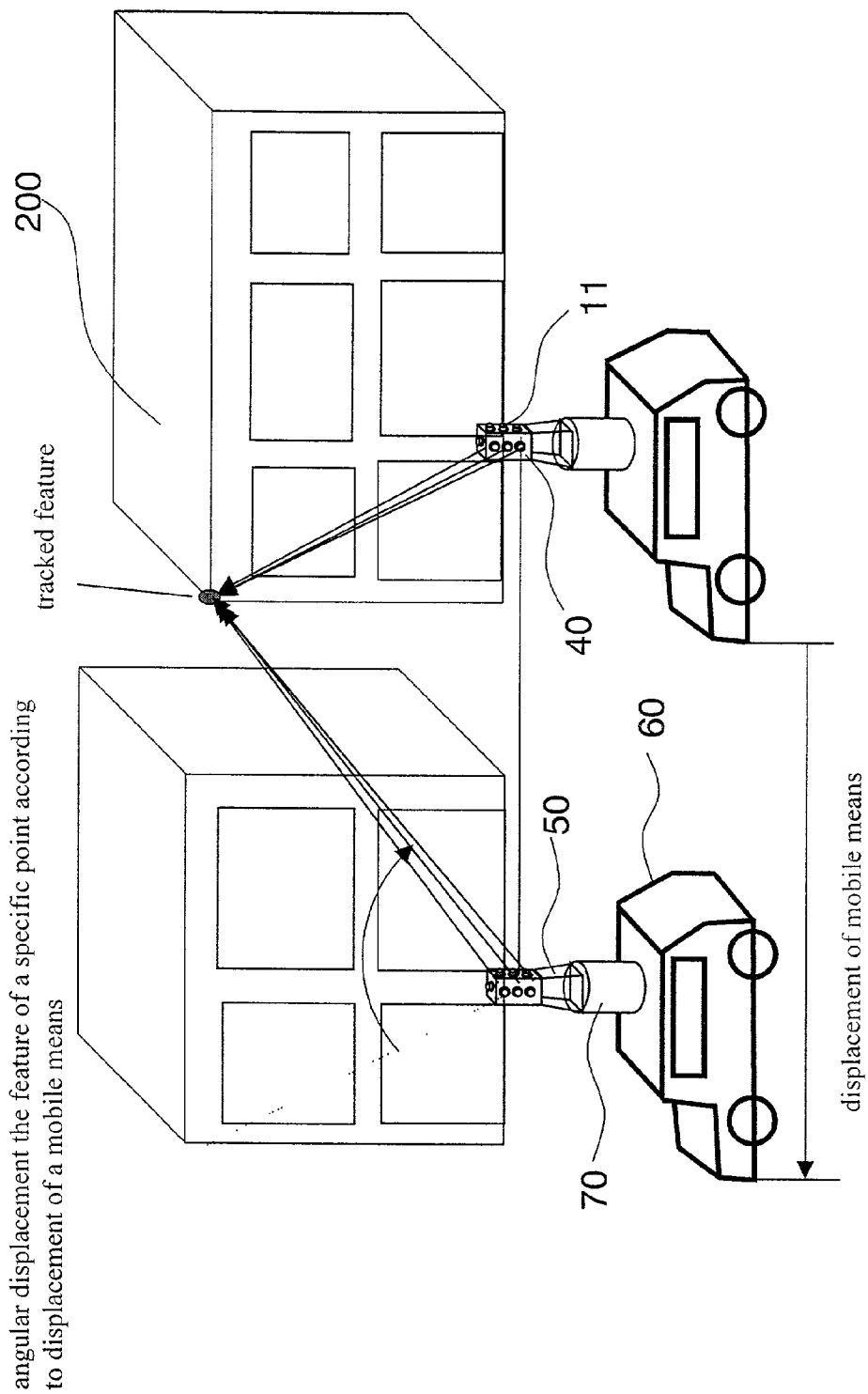

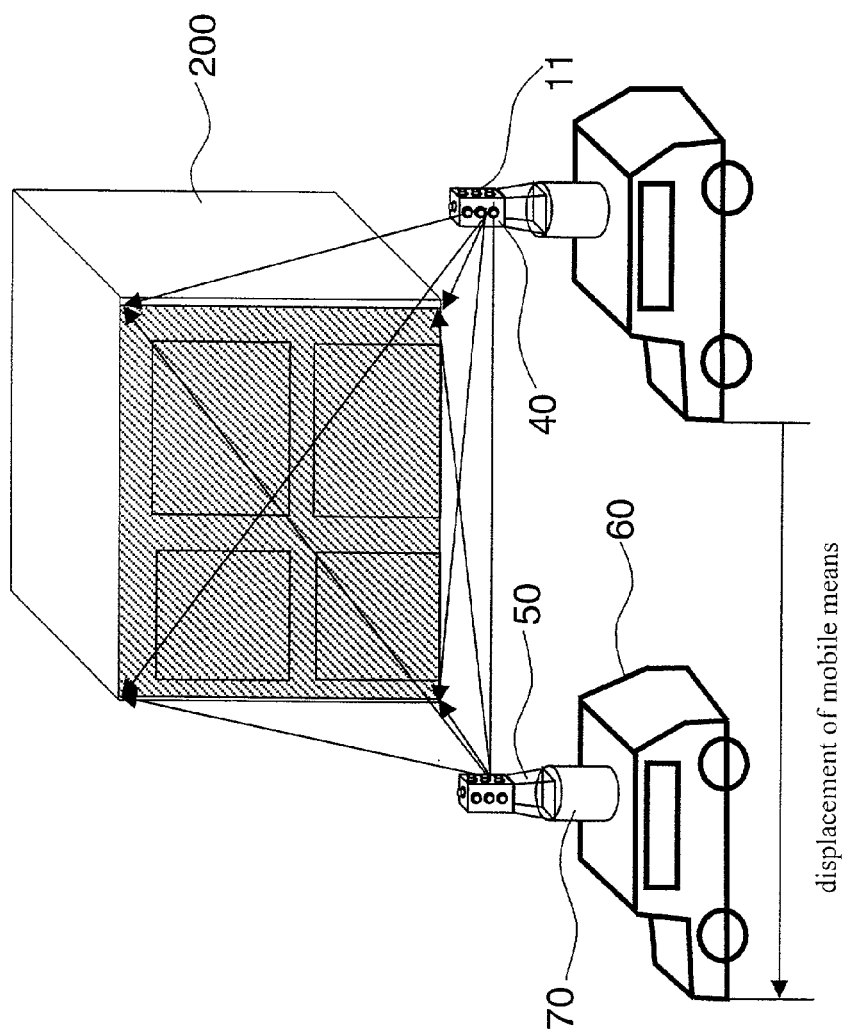

METHOD AND APPARATUS FOR OMNI-DIRECTIONAL IMAGE AND 3-DIMENSIONAL DATA ACQUISITION WITH DATA ANNOTATION AND DYNAMIC RANGE EXTENSION METHOD

RELATED U.S. APPLICATIONS

This application is entitled to the benefit of Provisional Patent Application Ser. No. 60/267,761 filed on Feb. 9, 2001 in the U.S.A.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to photography, and more particularly to a method and apparatus to acquire omni-directional images and 3-dimensional data with data annotation, and to a dynamic range extension method.

BACKGROUND OF THE INVENTION

There have been many efforts to capture and re-create human visual experience of being a location. Omni-directional photography is one way of effectively re-creating visual experience of a location at a specific moment. Omni-directional photograph may cover up to 360 degree horizontally and 180 degree vertically to cover whole spherical view from the photographing viewpoint.

However, to capture and re-create human visual experience, it is more efficient to concentrate capturing vicinity of horizontal viewing areas rather than trying to cover whole spherical view. For this reason, panoramic image, which omits upper part and lower part of spherical view, is also widely or generally used.

Currently, the prior-art methods to capture omni-directional images may be categorized as below:
(a) a method to cover about hemispheric viewing angle using non-planer mirror and a camera;
(b) a method to cover wider viewing angle using multiple planer mirror and multiple cameras;
(c) a method to generate a panoramic image by connecting a plurality of images which are obtained as a camera rotates;
(d) a method to produce a single image as by connecting a plurality of images which are obtained as a line-scan camera rotates (http://www.e-pan.com/index.html);
(e) a method to cover wider viewing angle by a plurality of imaged which are obtained as a plurality of cameras each of which covers different viewing angle (for example, U.S. Pat. No. 5,023,725); and
(f) a method to cover about hemispheric viewing angle using a camera with fisheye lens (for example, U.S. Pat. No. 5,185,667).

Each method above has inherently advantages and disadvantages. The methods (a) and (f) tend to produce low-resolution image unless the image sensor of the camera is especially very big since they try to cover very wide viewing angle with single camera. Method (b) is hard to cover wide vertical viewing angle without using very big mirrors. Methods (c) and (d) capture omni-directional images over the camera rotating time so that moving object can be captured in different location of multiple images in method (c) or distorted in method (d). Method (e) utilized a plurality of cameras to cover wider viewing angle. In method (e), as the number of camera increases, each camera can cover less viewing angle and overall image resolution can be desirably enhanced.

However, when an image-capturing device adopting the method (e) is installed with a vehicle moving in normal driving speed and captures images, each camera of the image-capturing device can not be precisely controlled.

Some of the desired precise controls for image capturing while in fast motion are (1) precise synchronization of triggering of all cameras at the desired photographing location and (2) an adjustment of optimal exposure amount of each camera facing to different direction without creating motion blur.

BRIEF SUMMARY OF THE INVENTION

The present invention is directed to the elimination of the problems appeared in applications and especially in method (e) by precisely sending triggering signal to each camera at a desired photographing location and by calculating optimal exposure of each camera and sending exposure signal to each camera in terms of gain, offset and exposure time. To precisely determine a desired location of photographing, the apparatus according to the present invention measures current location with GPS (Global Positioning System) sensor, distance sensor and direction sensor while in motion.

The present invention is also capable of acquiring omni-directional 3-dimensional data and dynamic range extension of the image acquisition apparatus.

The first object of the present invention is to provide method and apparatus for omni-directional image and 3-dimensional data acquisition with data annotation and dynamic rage extension method with multiple layers of camera set modules that omni-directionally photograph surrounding objects of the apparatus with different photographing angles to same object to acquire 3-dimensional data.

The second object of the present invention is to provide method and apparatus for omni-directional image and 3-dimensional data acquisition with data annotation and dynamic rage extension method with multiple layers of camera set modules that are also capable of acquiring images of same object with different exposure amount to extend dynamic range of the image data acquisition apparatus.

The third object of the present invention is to provide method and apparatus for omni-directional image and 3-dimensional data acquisition with data annotation and dynamic rage extension method that annotates a photographing location and a photographing time of photographed image so that the image data can be used as geographical information and it can used in connection with other geographical information in other GIS(Geographical Information System) database.

The fourth object of the present invention is to provide method and apparatus for omni-directional image and 3-dimensional data acquisition with data annotation and dynamic range extension method with multiple layers of camera set modules that enable related image data processing algorithm to enhance the calculation speed for 3-dimensional data acquisition.

In order to achieve the above objects, An omni-directional image and 3-Dimensional data acquisition apparatus, comprising: a multi-camera module constructed in a manner that a plurality of cameras are symmetrically arranged with a specific point in a plane, each of the cameras taking charge of each of divided angles such that the camera module can take an omni-directional continuous panoramic photograph of surrounding objects with the specific point; first frame grabbers each of which is electrically connected to each of the cameras of the multi-camera module, to grab photographed images by frames; an exposure calculator electrically connected to the frame grabbers, to calculate exposure of each camera, based on the grabbed images by frames; an exposure signal generator electrically connected to each camera, to transmit information about the exposure as a signal on the basis of the exposure calculated by the exposure calculator; storage means electrically connected to the each first frame grabber, to store images photographed by the cameras according to photographing location and photographing time; a GPS sensor to sense the photographing location and photographing time; an annotation entering unit electrically connected to the GPS sensor to calculate location and time corresponding to each frame based on sensed data of the GPS sensor, the annotation entering unit being electrically connected to the storage means to enter the calculated location and time in each frame as annotation; and a trigger signal generator electrically connected the storage means, the exposure signal generator, the annotation entering unit, the trigger signal generator selectively transmits a trigger signal to the exposure signal generator or the annotation entering unit in order that the cameras start to photograph the objects according to the trigger signal; and wherein the multi-camera module are vertically stacked and formed in at least two layers in the direction of height.

The apparatus further comprising a plurality of light intensity sensors electrically connected to the exposure calculator to allow the exposure calculator to be able to calculate the exposure amount of each camera based on external light intensity.

In the apparatus, wherein the storage means is one of digital storage devices including a hard disk, compact disk, magnetic tape and memory.

The apparatus further comprising an audio digital converter electrically connected to the storage means, the audio digital converter converting an audio signal sensed by an audio sensor into a digital signal as an audio clip to correspondingly attach to each image or image group to be stored in the storage means.

The apparatus further comprising a video camera electrically connected to the storage means via a second frame grabber for grabbing photographed moving pictures by frames, to e the storage means a unique video clip corresponding to each image stored in the storage means.

In the apparatus, wherein the multi-camera module further has at least one camera placed at the top thereof so that the camera can photograph an object upward.

The apparatus further comprising mobile means, on which the multi-camera module is mounted, to enable continuous panoramic photographing of the camera module while moving.

The apparatus further comprising a distance sensor and a direction sensor for respectively sensing the distance and direction of the image photography by each camera.

In order to the above objects, a method for acquiring 3-dimensional data according to the present invention, comprising the steps of: acquiring for multi images of an object in the direction of height photographed by the cameras, multi camera modules in the direction of height, the multi camera module including a plurality of cameras which are symmetrically arranged at a specific point in a plane, and which take charge of each allocating viewing angle calculated by 360° divided by the number of the cameras; searching for corresponding points in each image; extracting for distance information using trigonometry; and acquiring for 3-dimensional image data base on the distance information.

In order to achieve the above object, a method for extending dynamic range of images according to the present invention, comprising the steps of: acquiring for multi images of an object, the multi images are photographed by the cameras which have different exposure amount each other, multi camera modules in the direction of height, the multi camera module including a plurality of cameras which are symmetrically arranged at a specific point in a plane, and which take charge of each allocating viewing angle calculated by 360° divided by the number of the cameras; selectively extracting for regions in the multi images, wherein the regions have constant exposure amount; and acquiring for images of dynamic range extension, which are generated by composing the extracting regions.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE SEVERAL VIEWS OF THE DRAWINGS

The accompanying drawings, which are included to provide a further understanding of the invention and are incorporated in and constitute a part of this application, illustrate exemplary embodiment(s) of the invention and together with the description serve to explain the principle of the invention.

FIG. 3 illustrates the system configuration of an omni-directional 3-dimension image data acquisition apparatus according to the second embodiment of the present invention.

FIG. 27 illustrates the depth effect on the slope of optical flow by the multiple camera module with respect to an epipolar plane according to the present invention.

FIG. 28 is a perspective view illustrating a principle of acquiring 3 dimension data for a specific feature point by displacement of the omni-directional 3-dimension image data acquisition apparatus of the present invention; and FIG. 29 illustrates a principle of feature tracking of an object when the omni-directional 3-dimension image data acquisition apparatus of the invention photographs the object while moving.

DETAILED DESCRIPTION OF THE INVENTION

Reference will now be made in detail to the preferred embodiments of the present invention, examples of which are illustrated in the accompanying drawings.

Figure 1:
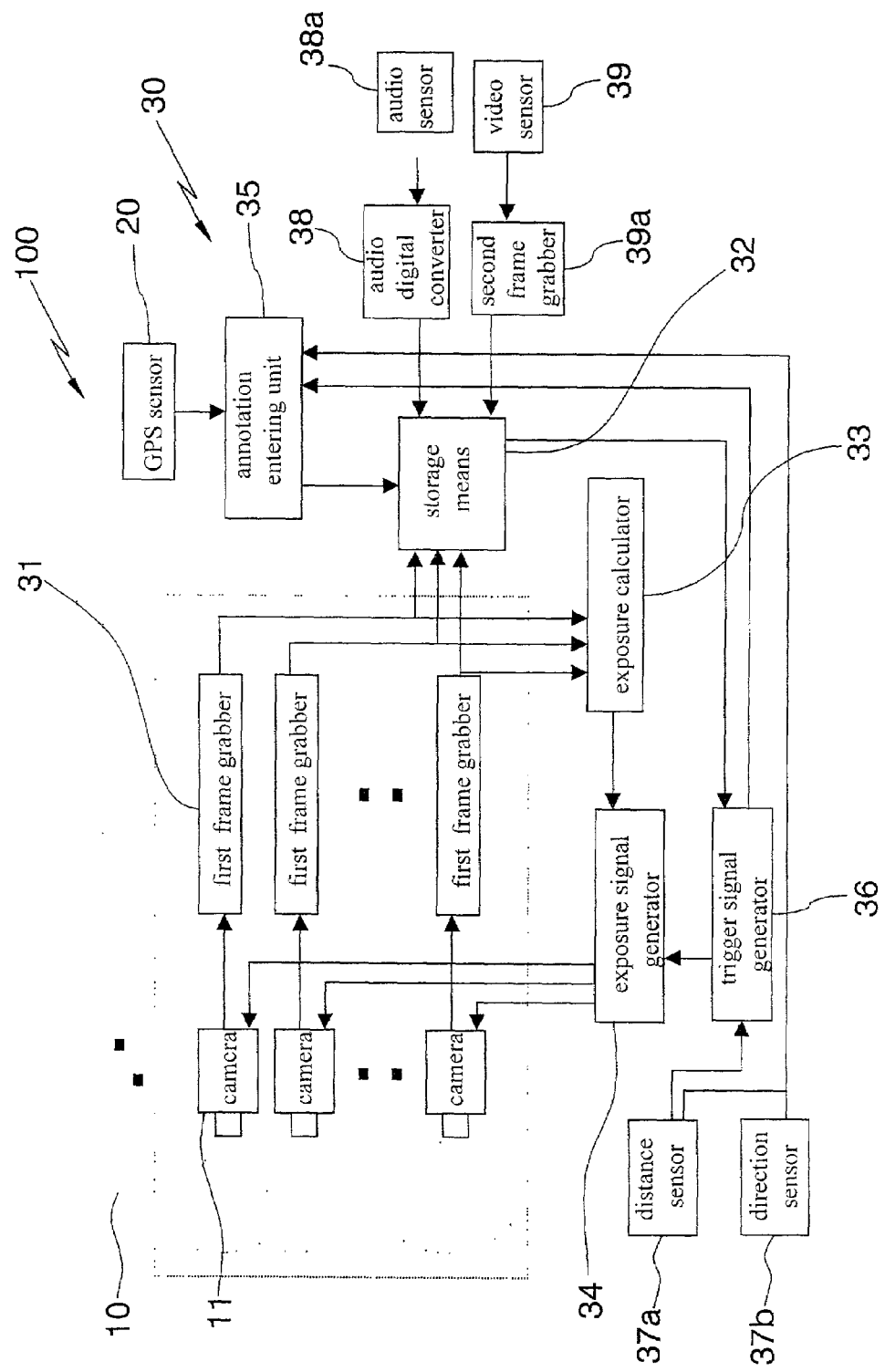
FIG. 1 illustrates the system configuration of an omni-directional 3-dimension image data acquisition apparatus according to the first embodiment of the present invention.

FIG. 1 illustrates the system configuration of an omni-directional 3-dimension image data acquisition apparatus according to the first embodiment of the present invention, and FIGS. 2A to 2F illustrate various exemplary embodiments of a multi-camera module according to the present invention.

Referring to FIG. 1 and FIGS. 2A to 2F, the omni-directional 3-dimension image data acquisition apparatus 100 comprises a multi-camera module 10 and a computer vision system 30 electrically connected to the multi-camera module 10. The multi-camera module 10 is constructed in such a manner that a plurality of cameras 11 are arranged symmetrically with a specific point in the center such that the camera module 10 can take a photograph of an object 200 360° omni-directionally.

Here, each multi-camera module 10 with a plurality of cameras 11 is vertically stacked and forms multi layers. Each multi-camera module 10 forming multi layers can photograph an object 200 corresponding to its height with changing the viewing angle of the object 200 and generating the images of the object 200. Therefore, the image acquisition apparatus can acquire 3-dimensional images by combining the images from a plurality of cameras 11 of each multi-camera module 10. Also, if each camera 11 of the stacked multi-camera module 10 photographs an object 200 with different exposure amount, then the apparatus can extend dynamic range.

The computer vision system 30 stores images photographed by each camera 11 as digital data. Images photographed by the multi-camera module 10 are grabbed by frames by first frame grabbers 31 of the computer vision system 30. An annotation entering unit 35 enters annotations corresponding to the images by corresponding photographing locations and time, and a storage means 32 stores the images with the annotations.

In the apparatus 100, the multi-camera module 10 is constructed in a manner that the optical axis of the cameras 11 are placed on the same plane and the cameras 11 are arranged symmetrically with a specific point in the center.

Each camera 11 takes charge of each of divided angles of omni-direction so as to be able to carry out 360° photographing with a panoramic photographing technique. In case where four or five cameras 11 construct the multi-camera module 10, for example, each camera 11 is in charge of the angle of 90° or 72° approximately. Further, a plurality of multi-camera modules 10 are stacked to form multi layers to allow the cameras 11 of the multi-camera module 10 to be capable of taking a picture of an object 200 with different photographing angles in the direction of height. For this, the cameras 11 of the multi-camera modules 10 are lined up in the direction of height.

Figure 2A:
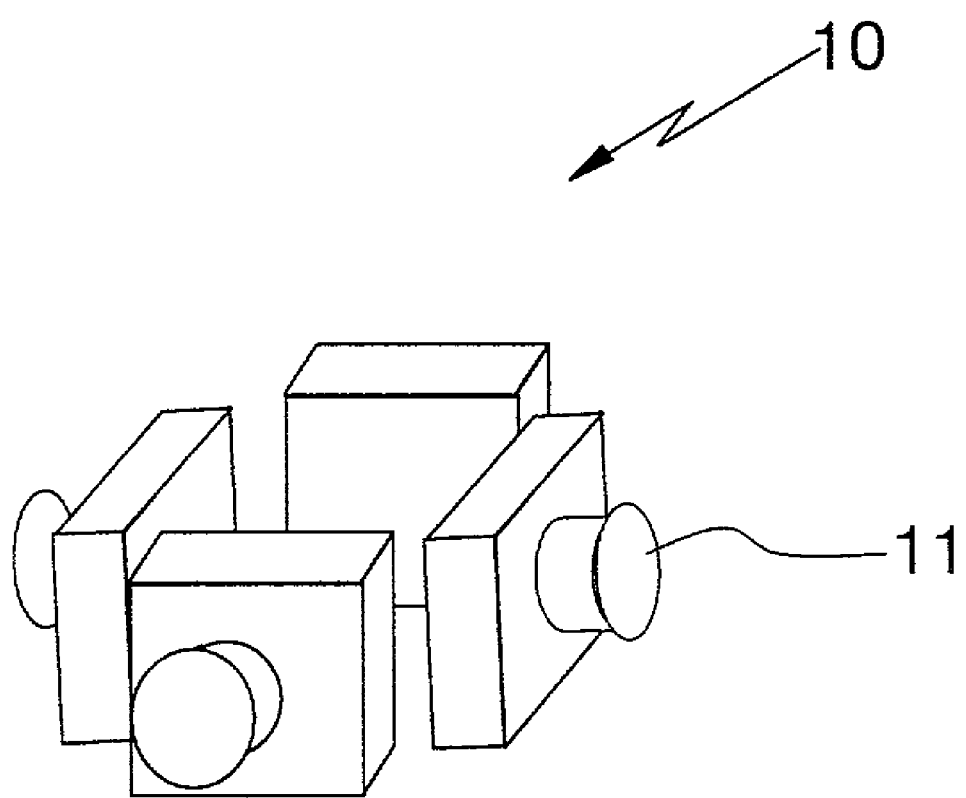
FIG. 2A illustrates the first exemplary embodiment of a multi-camera module according to the present invention.
Figure 2B:
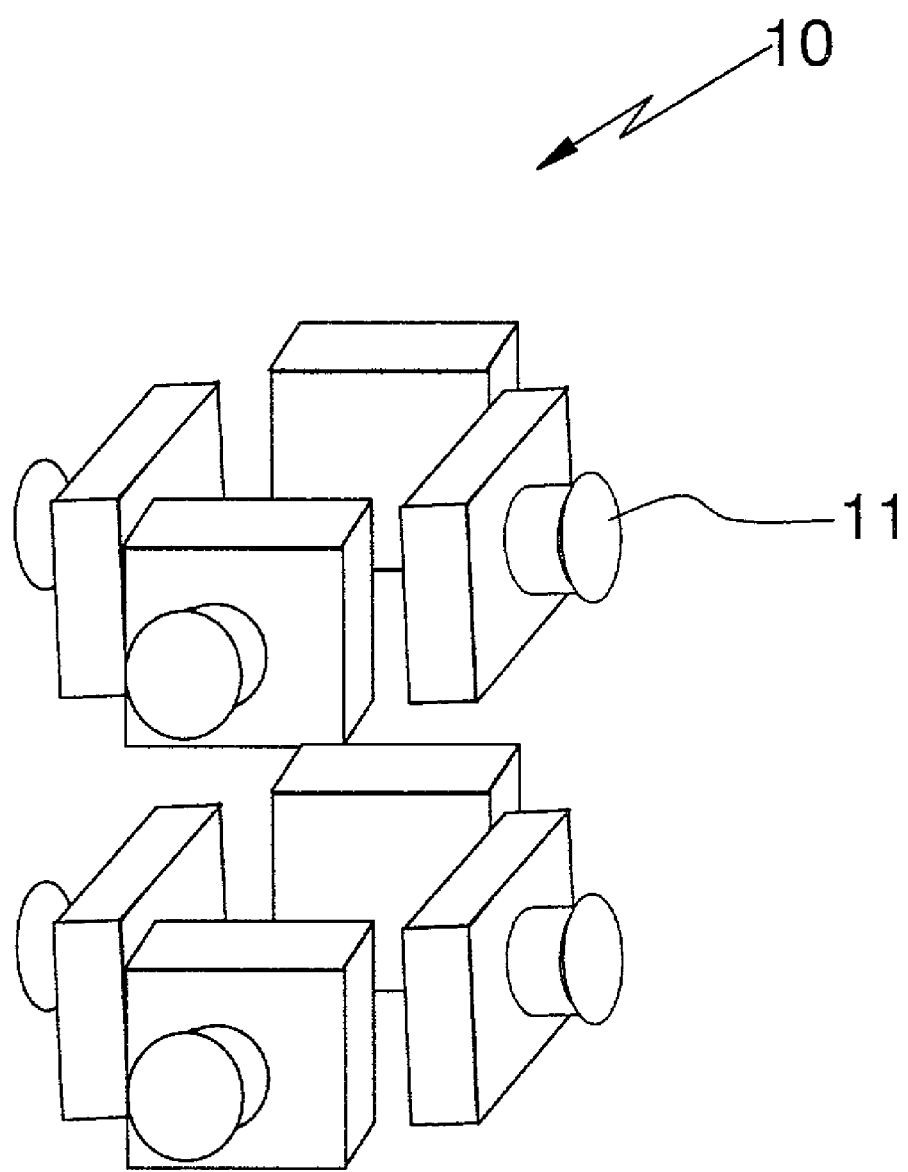
FIG. 2B illustrates the second exemplary embodiment of the multi-camera module according to the present invention.
Figure 2C:
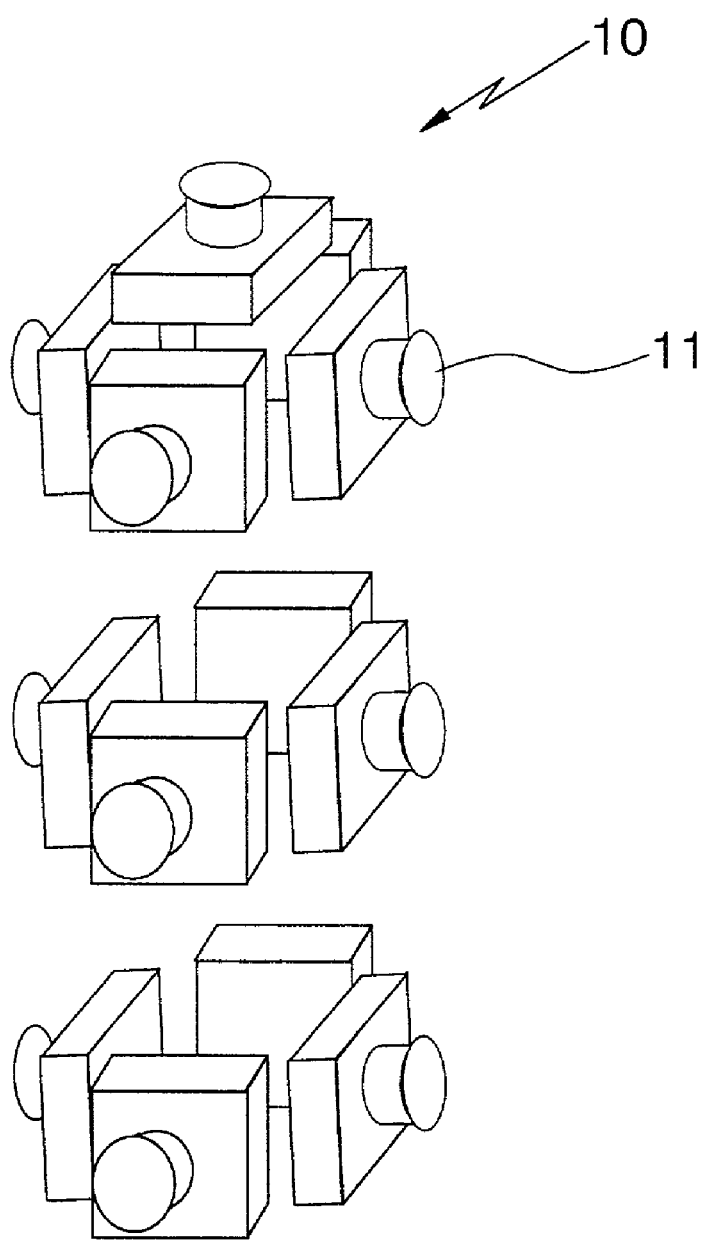
FIG. 2C illustrates the third exemplary embodiment of the multi-camera module according to the present invention.
Figure 2D:
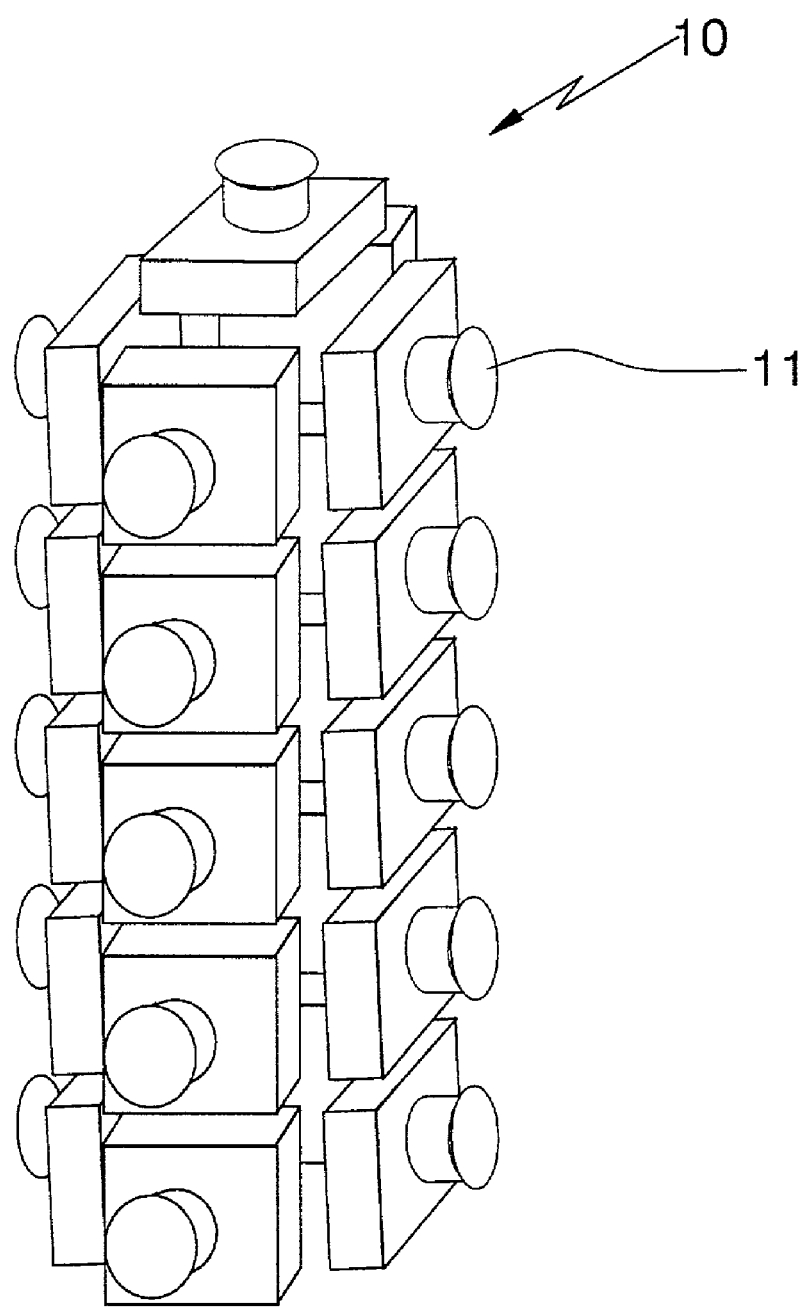
FIG. 2D illustrates the fourth exemplary embodiment of the multi-camera module according to the present invention.
Figure 2E:
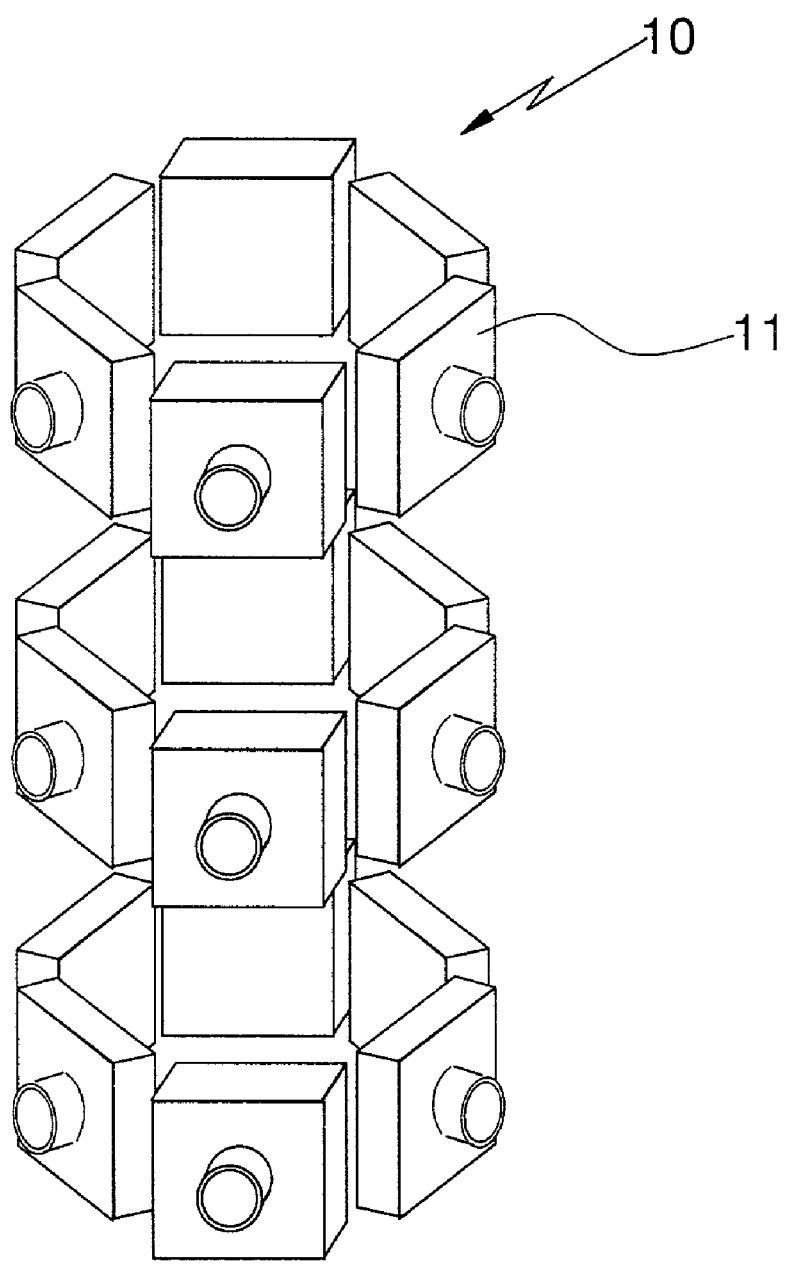
FIG. 2E illustrates the fifth exemplary embodiment of the multi-camera module according to the present invention.
Figure 2F:
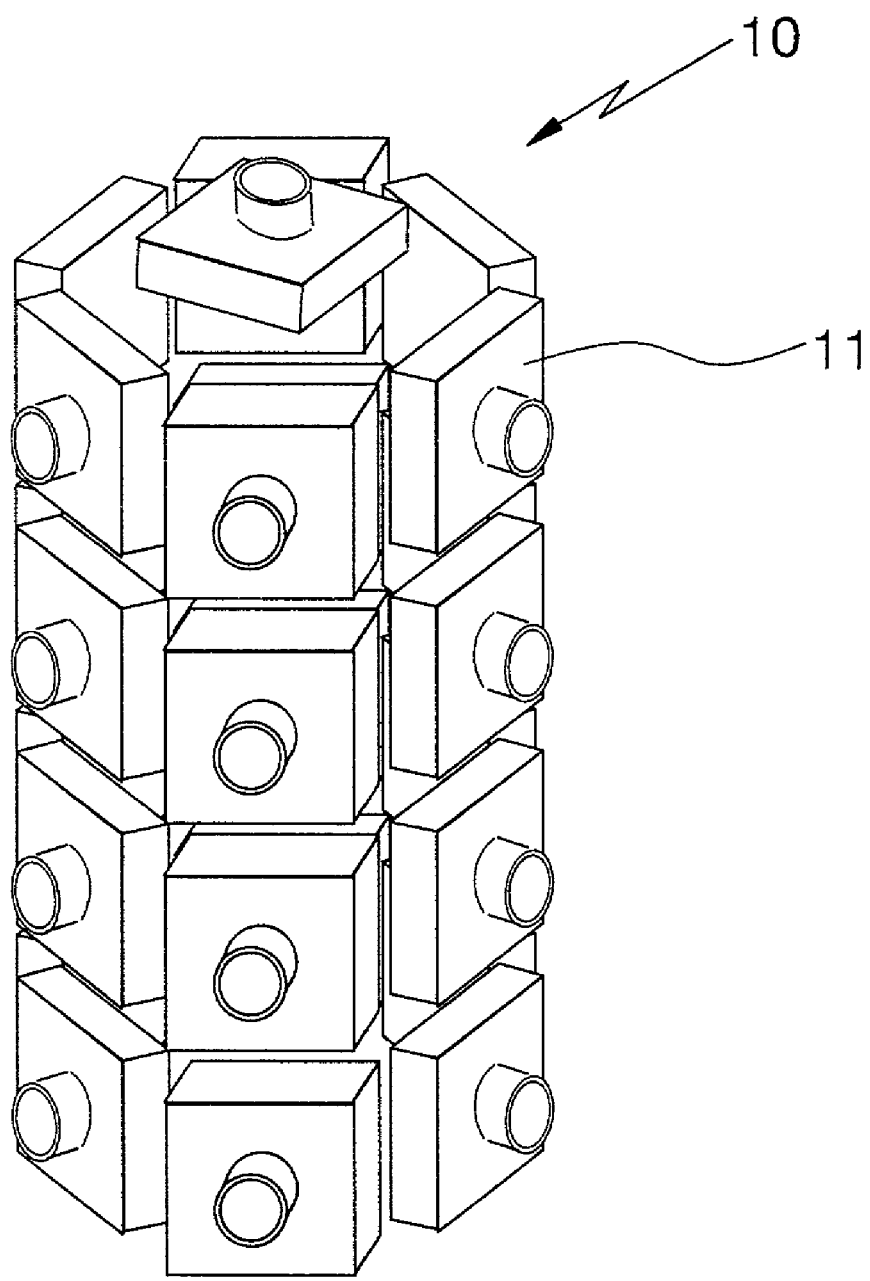
FIG. 2F illustrates the sixth exemplary embodiment of the multi-camera module according to the present invention.

Moreover, with the layered multi-camera modules 10, the uppermost multi-camera module 10 further includes one camera 11 as shown in FIGS. 2C, 2D and 2F This camera 11 set on the top of the multi-camera modules 10 has upward photographing direction so that the multi-camera modules 10 can carry out upward photographing as well as omni-directional photographing.

The images photographed by the cameras 11 of the multi-camera module 10 are grabbed by frames by the first frame grabbers 31. When one multi-camera module 10 corresponds to one layer, the first frame grabber 31 is respectively connected to each cameras 11 constructing each layer. The images by frames grabbed by the first frame grabbers 31 are stored in the storage means 32 and, simultaneously, transmitted to an exposure calculator 33. The storage means 32 that stores photographed images as digital data may be selected from digital storage devices including a hard disk, compact disk, magnetic tapes and memory.

The images sent to the exposure calculator 33 from the first frame grabbers 31 are analyzed by the exposure calculator 33, to thereby calculate exposure of each camera 11. The calculated exposure is transmitted to an exposure signal generator 34 electrically connected to the exposure calculator 33. The exposure signal generator 34 sends a signal corresponding to the degree each camera 11 should expose to each camera 11 based on the exposure. At this time, geographical information such as a photographing location and time, distance, and direction of each camera 11 can be obtained using a GPS sensor 20 capable of collecting location information from a satellite in real time.

In addition to the GPS sensor 20, a distance sensor 37a and direction sensor 37b can be further included to obtain the photographing distance and direction. The GPS sensor 20 can receive location data from a satellite in real time to confirm the location information in real time. A GPS signal from the satellite, however, may be cut off when photographing is carried out in an area where GPS signal can be blocked, such as high building, tunnel, forest and so on.

If the effectiveness of the GPS signal is remarkably deteriorated, as described above, signals sensed by the distance sensor 37a and direction sensor 37b are used as secondary information.

The annotation-entering unit 35 is electrically connected with the GPS sensor 20, distance sensor 37a and direction sensor 37b to receive geographical information data sensed by the sensors 20, 37a and 37b. The annotation-entering unit 35 enters annotation corresponding to each frame to be stored in the storage means 32. The annotation is photographing location and photographing time of each frame of photographed images. The images in which annotations are entered by frames are stored in the storage means 32. Here, the storing means 32 stores the images transmitted from the camera 11 after the camera 11 photographing or at the same time when the camera 11 photographs and transmits thereto. In addition, it is required that sensing operations of the sensors 20, 37a and 37b related with the storing and photographing operations, and the operations such as calculation and interchange of exposure information with respect to the camera 11 are carried out in relation to each other.

The photographing and storing operations and the operations related thereto start when a trigger signal generator 36 transmits the trigger singals to the storage means 32 and the exposure signal generator 34.

Also, the trigger signal generator 36 is electrically connected to the distance sensor 37a and the annotation-entering unit 35.

When annotating photographing location and time, geographical information transmitted from the GPS sensor 20 to the annotation entering unit 35 is used first.

If the effectiveness of the GPS sensor 20 is deteriorated, annotation entering unit 35 uses signal sensed by the distance sensor 37a and direction sensor 37b to calculate location information.

When the storing speed of the images in the storage means 32 is slower than the acquiring speed of the images, the trigger signal of the trigger signal generator 36 can be temporarily blocked to the storage means 32 in order that image storing operation paces with the image acquiring operation.

Meantime, the storage means 32 further connects with an audio digital converter 38 or a video camera 39, so that a corresponding audio clip or video clip as an accessory data attaches to each image or group of images to be stored in the storage means 32. The audio digital converter 38 converts an analog audio signal sensed by an audio sensor 38a into a digital signal to store it in the storage means 32 as digital data. The video camera 39 takes a motion picture of the objects 200 at a photographing location or a photographing interval of a location, corresponding to photographed image or image groups. The motion pictures are grabbed by frames by a second frame 39a to be stored in the storage means 32.

FIG. 3 illustrates the system configuration of an omni-directional 3-dimension image data acquisition apparatus according to the second embodiment of the present invention.

Referring to FIG. 3, the exposure calculator 33 calculates the exposure of each camera 11. The calculated exposure information is transmitted to each camera 11 by the exposure signal generator 34. Here, light intensity sensors 33a are electrically connected to the exposure calculator 33 to sense light intensity around the photographing location or in front of the object 200 to be photographed.

Accordingly, a light intensity sensing signal transmitted from the light intensity sensor 33a is delivered to the exposure calculator 33 that calculates the exposure of each camera 11. The calculated exposure is transmitted as a signal to each camera 11 through the exposure signal generator 34. Each camera 11 controls exposure amount thereof based on the exposure signal.

Figure 4:
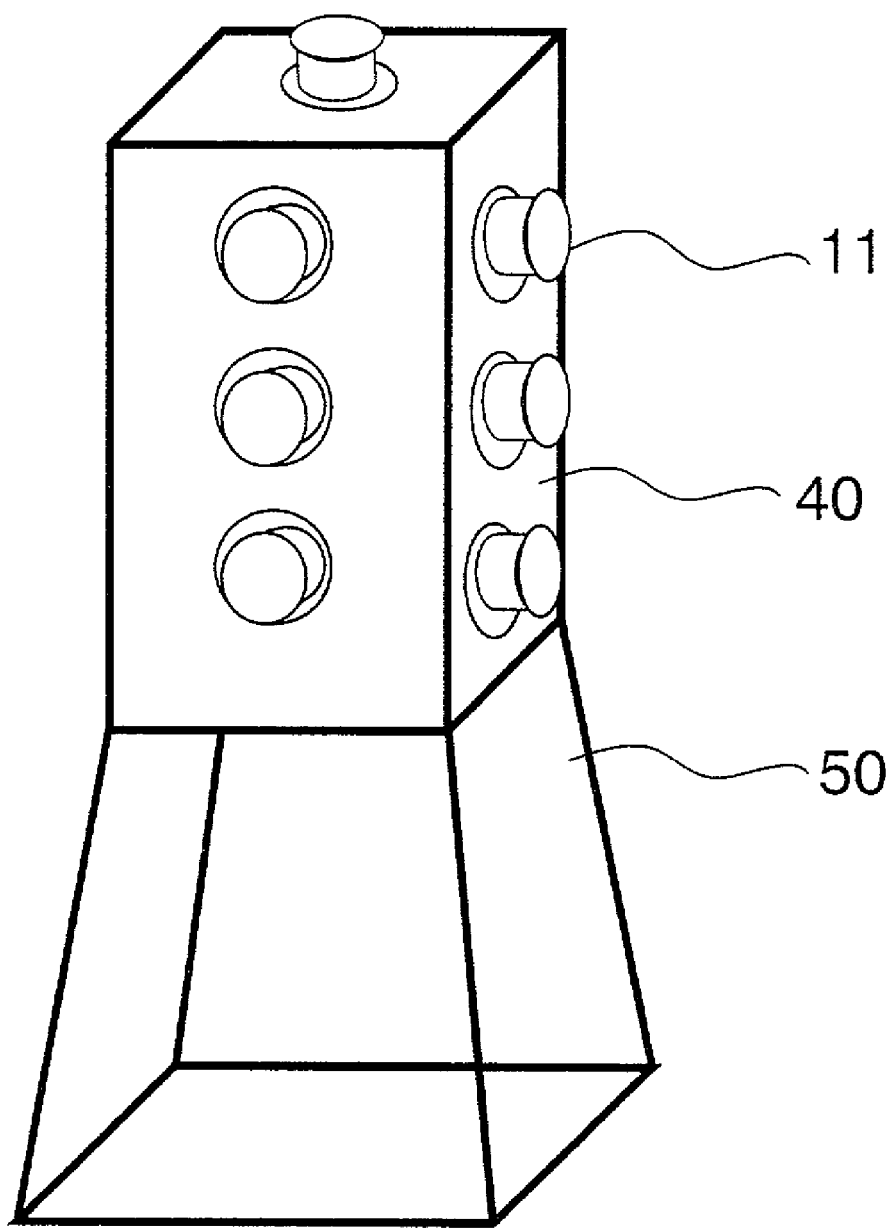
FIG. 4 is a perspective view illustrating that the multi-camera module of the invention is set in a housing.
Figure 5:
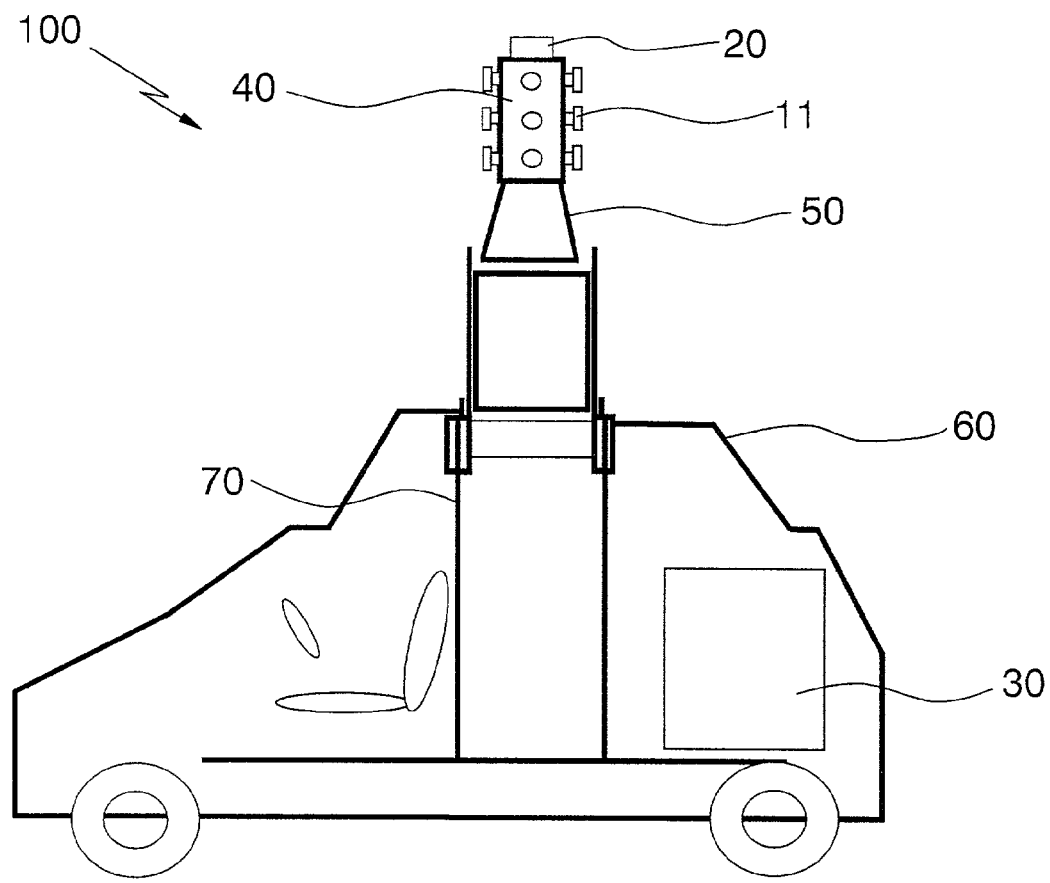
FIG. 5 illustrates the first exemplary embodiment that the omni-directional 3-dimension image data acquisition apparatus of the invention is mounted on a mobile means.
Figure 6:
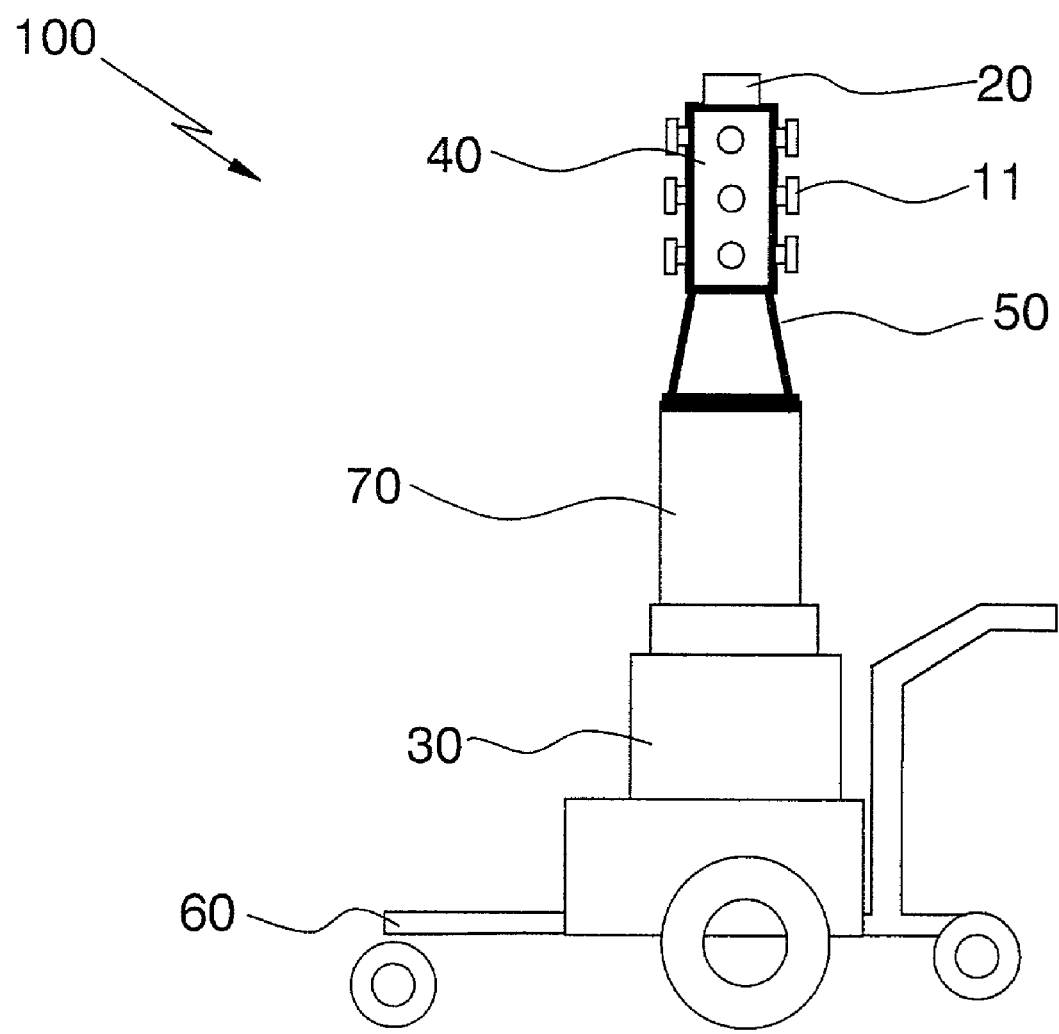
FIG. 6 illustrates the second exemplary embodiment that the omni-directional 3-dimension image data acquisition apparatus of the invention is mounted on a mobile means.

FIG. 4 is a perspective view illustrating that the multi-camera module of the invention is set in a housing, FIG. 5 illustrates the first exemplary embodiment that the omni-directional 3-dimension image data acquisition apparatus of the invention is mounted on a mobile means, and FIG. 6 illustrates the second exemplary embodiment that the omni-directional 3-dimension image data acquisition apparatus of the invention is mounted on a mobile means.

Referring to FIGS. 4 to 6, the multi-camera module 10 and computer vision system 30 are mounted on a mobile means 60 to be given a mobile function to photograph the object 200 while moving. The multi-camera module 10 is set inside a specific housing 40 to protect its body and expose only the lens part to the outside. The bottom of the housing 40 is supported by a jig 50 to be raised to a specific height, and the housing 40 is moved up and down by an elevator 70 set in the mobile means 60. The mobile means 60 is preferably an automobile having a driving engine or a cart capable of being moved by the human power or self-propelled by its own power supply. The automobile is used when the camera module 10 photographs an object 200 while moving on the drivable road and the cart is used in case where it takes a picture of an object 200 while moving on the sidewalk or hallway of indoor area.

Figure 7:
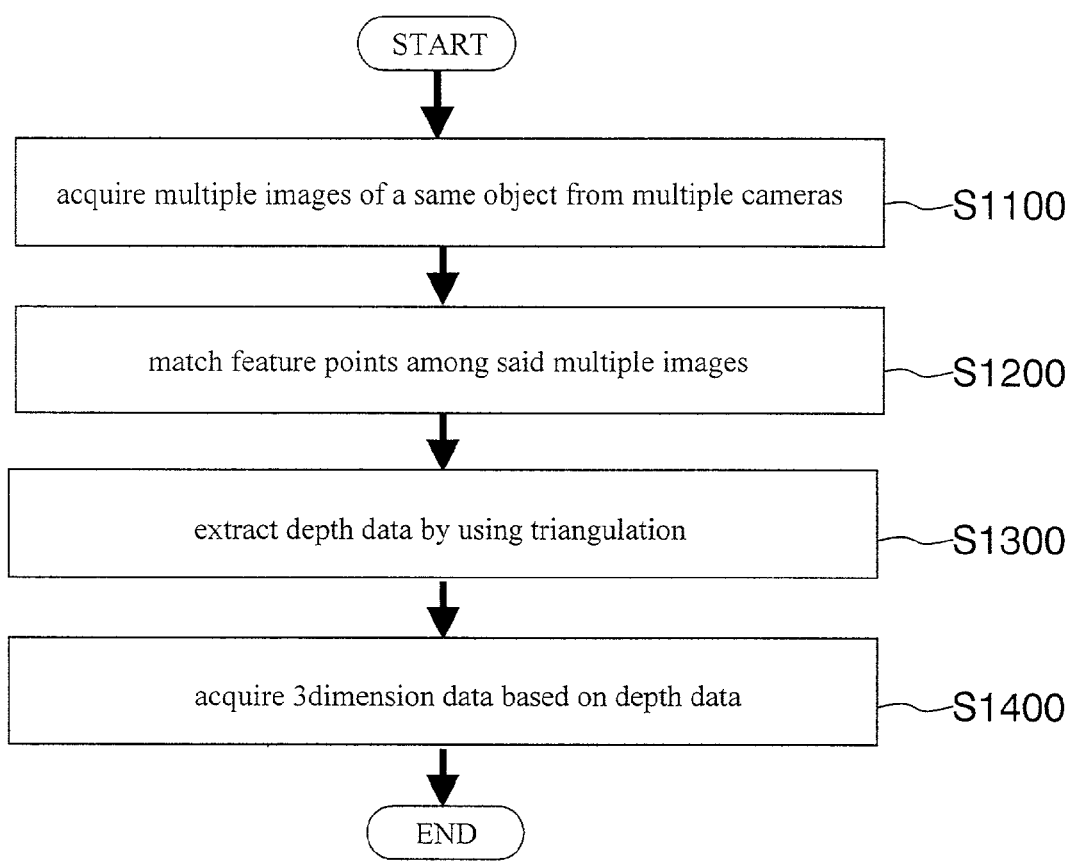
FIG. 7 is a flow diagram illustrating a method of acquiring 3-dimensional data according to the present invention.

FIG. 7 is a flow diagram illustrating a method of acquiring 3-dimensional data according to the present invention.

As illustrated in FIG. 7, first of all, a multi-camera module 10 according to the present invention includes a plurality of cameras 11 which are symmetrically arranged each other with respect to a specific point and each optical center of which is in the same horizontal plane. In order to acquire 3-dimensional data, the multi-camera module 10 stacks or constructs multiple layers in the direction of height, each optical center plane of which is horizontally in parallel and all the center of the optical center plane is vertically at the same point. All the cameras 11 included in every multi-camera module 10 forming multi layers photograph or acquire multiple images of an object 200 according to the direction of height S1100. Due to the height difference among cameras 11, images taken from each cameras 11 are also different therefrom regarding the same object 200. Then, the apparatus matches feature points of same object 200 among the images S1200, and extracts distance information of the images by measuring the distance of the feature points using geometric trigonometry S1300. Then, the apparatus acquires 3-dimensional data with darkness and brightness information based on the extracted distance information S1400.

Figure 8:
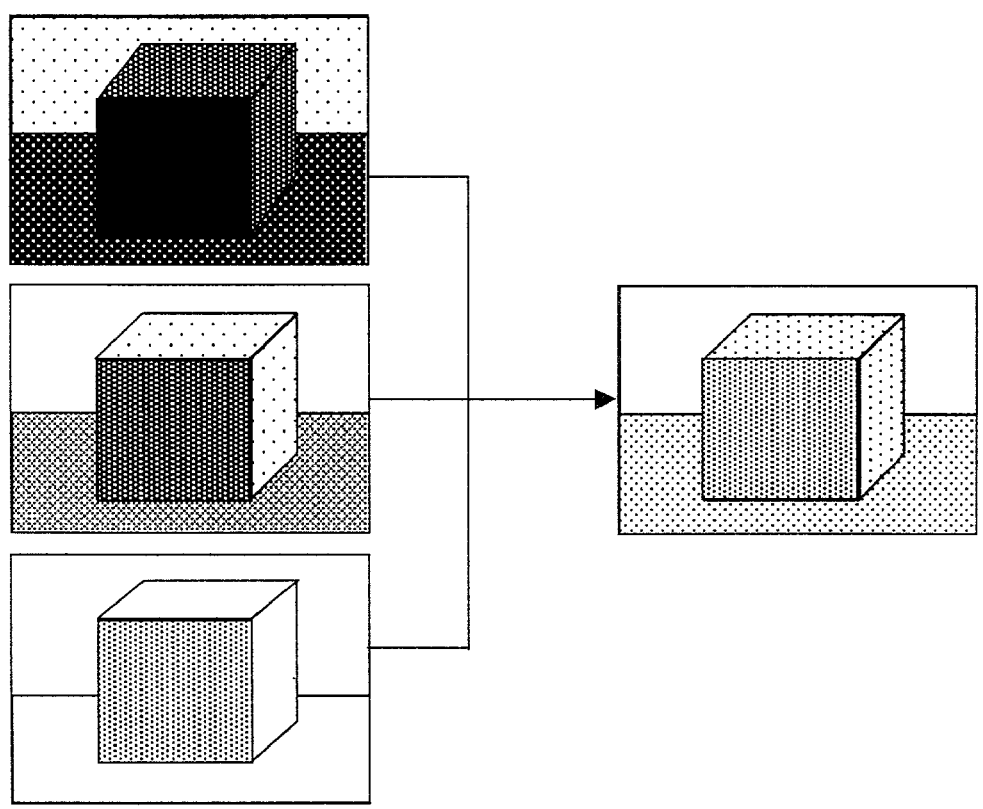
FIG. 8 illustrates a method of extending dynamic range of camera system with images photographed according to the present invention.

FIG. 8 illustrates a method of extending dynamic range of camera system with images photographed according to the present invention.

Referring to FIG. 8, three multi camera modules 10 layered vertically took three images of the same object 200 with different exposure amount.

Each camera 11 has limited dynamic range such that if an area of the object 200 is brighter than upper limit of the dynamic range, then the area is recorded as white, and if an area of the object 200 is darker than lower limit of sensitivity range, then the area is recorded as black. Details of image of the area are lost in both cases. If the cameras 11 record the same object 200 with different exposure amount, even though brightness of an area of the object 200 exceeds dynamic range of the camera 11, other cameras 11 with different exposure amount may have the area sensed within the dynamic range. Each camera 11 can photograph different portions of the object 200 in detail, and a better image can be composed by selecting better regions from the images.

Figure 9:
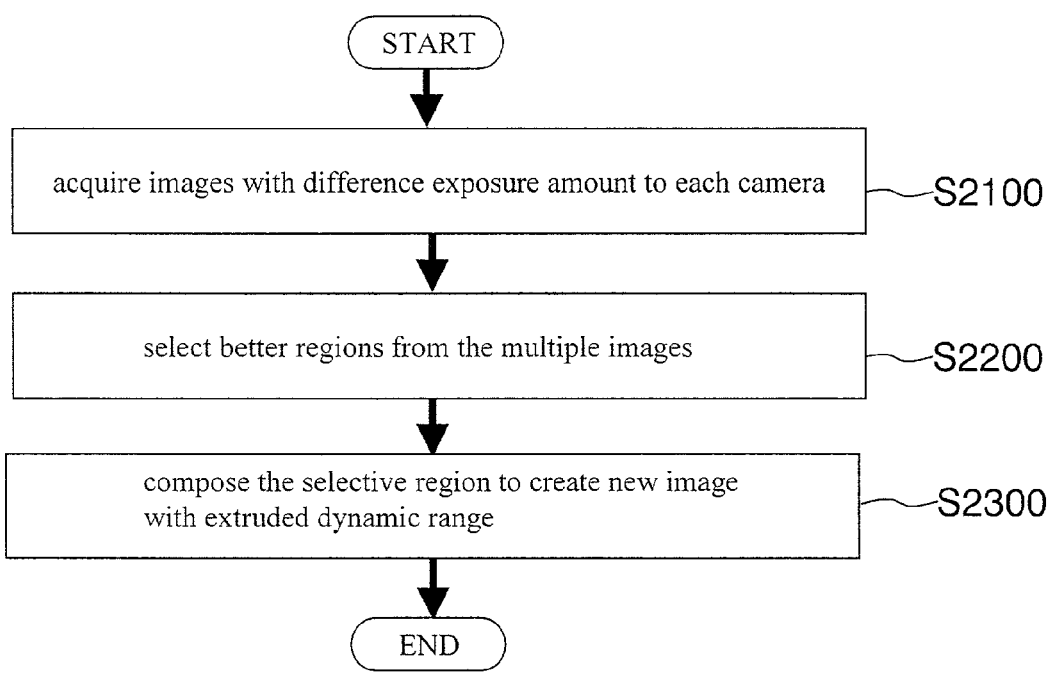
FIG. 9 is a flow diagram illustrating a method of dynamic range extension according to the present invention.

FIG. 9 is a flow diagram illustrating a method of dynamic range extension according to the present invention.

In order to extend dynamic range, as shown in FIG. 9, three sets or layers of multi-camera modules 10 are constructed in the direction of height. Here, each set or layer of multi-camera module 10 has a plurality of cameras 11 which are symmetrically installed in a plane so that the optical center of each camera 11 is in the same plane and at a specific point. Further, each viewing angle of the cameras 11 is allocated by dividing 360 by the number of the cameras 11.

Then, each camera 11 differently set the exposure amount photographs an object 200 and thereby multiple images of same object 200 from multiple cameras 11 are acquired S2100.

Properly exposed region is selectively extracted in each of the photographed multiple images. Namely, the properly exposed region is possibly selected in the definitely photographed image which is identified with naked eyes S2200.

Therefore, final images extended dynamic range are acquired after composing the extracted regions S2300.

Even though the above method acquires the dynamic range extension images using three sets of the multi-camera modules 10, it is easily understood that any number of two or more cameras 11 can be used to extend dynamic range.

Figure 10:
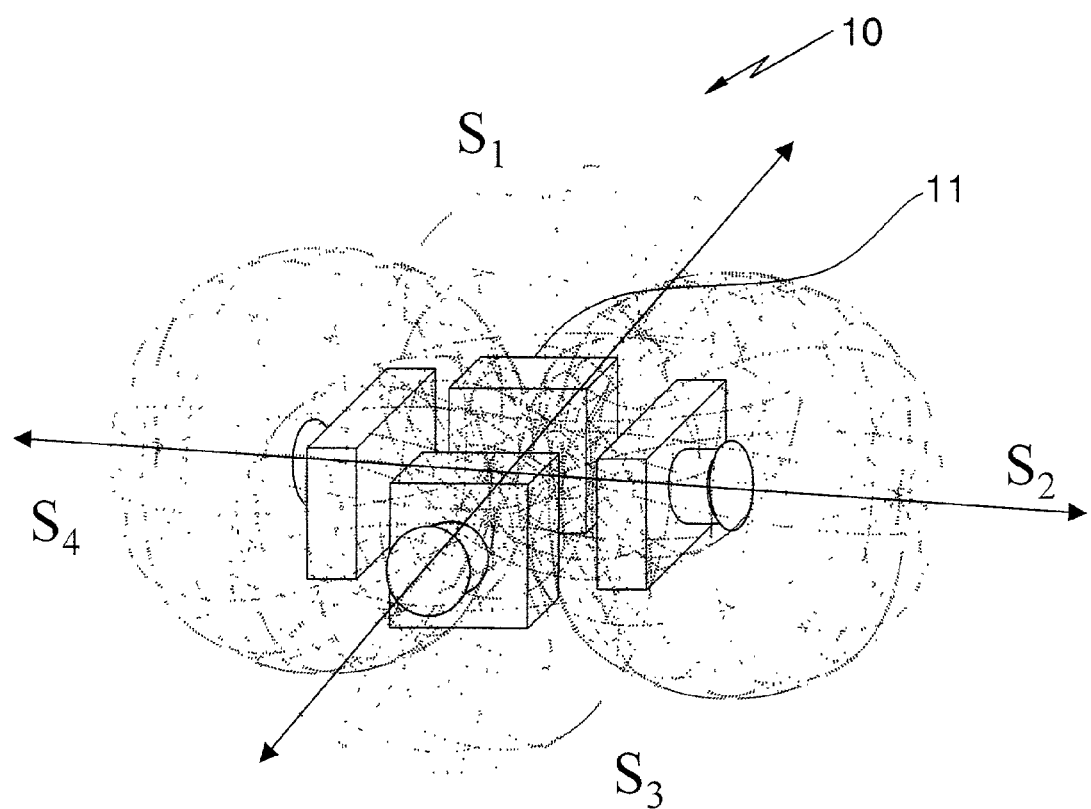
FIG. 10 is a perspective view illustrating spherical coordinates set to the multi-camera module to apply image processing algorithm according to the present invention.

FIG. 10 is a perspective view illustrating spherical coordinates set to the multi-camera module to apply image processing algorithm according to the present invention.

Wide angle or omni-directional multi camera module 10 with cameras may have multiple optical centers. Each camera 11 has its own optical center and effective viewing angle to cover portion of spherical coordinate. For the viewing angle that the camera 11 is covering, the omni-directional image sensor has single optical center. In this exemplary embodiment, four distinct spherical coordinates are initially assumed and calibrated. Even though this example shows four cameras 11, it should be understood that any number of cameras 11 might be used without modifying disclosed method. These spherical coordinates can be rotated to any direction to align with paired cameras 11 to apply epipolar geometry more effectively.

Figure 11:
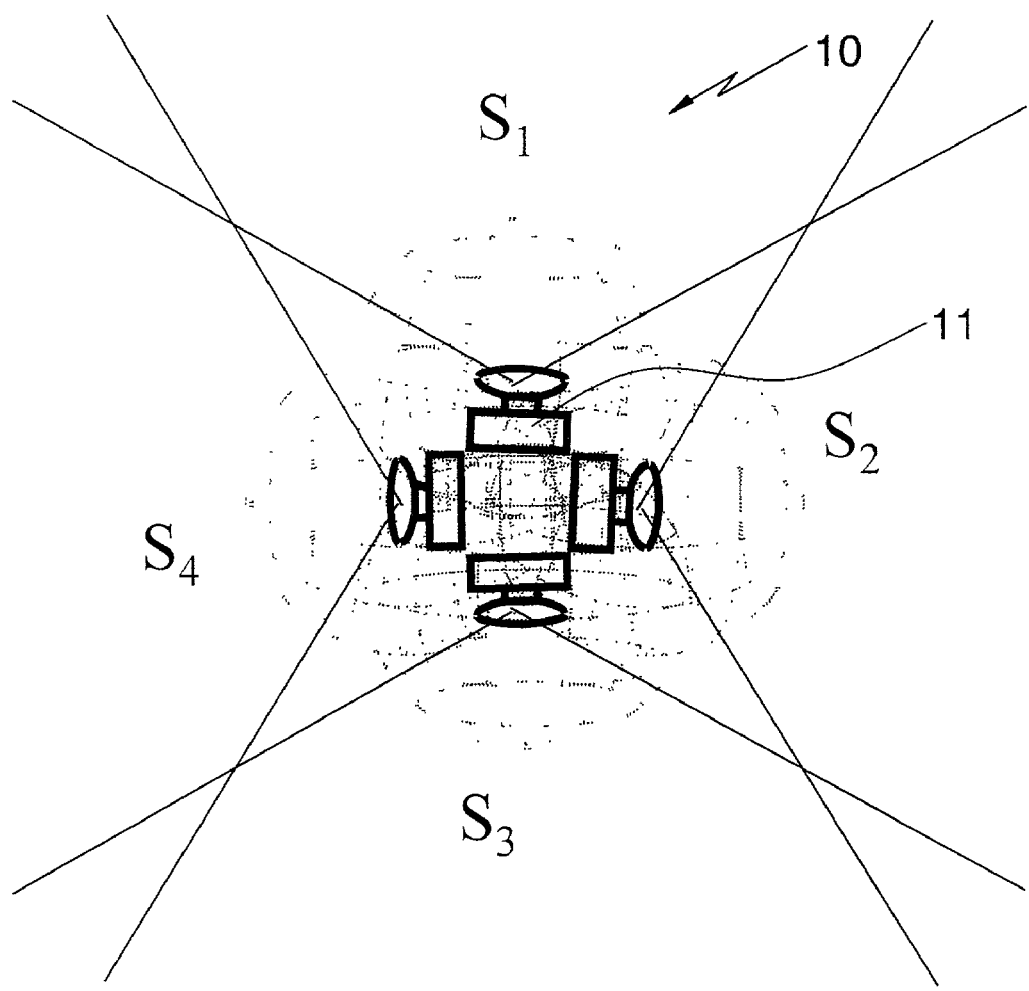
FIG. 11 is a plan view illustrating the upper part of the coordinates of FIG. 10.

FIG. 11 is a plan view illustrating the upper part of the coordinates of FIG. 10.

In this exemplary embodiment, four camera 11 with effective viewing angle 120 covers 360 of panorama with some overlapped viewing angle.

Figure 12:
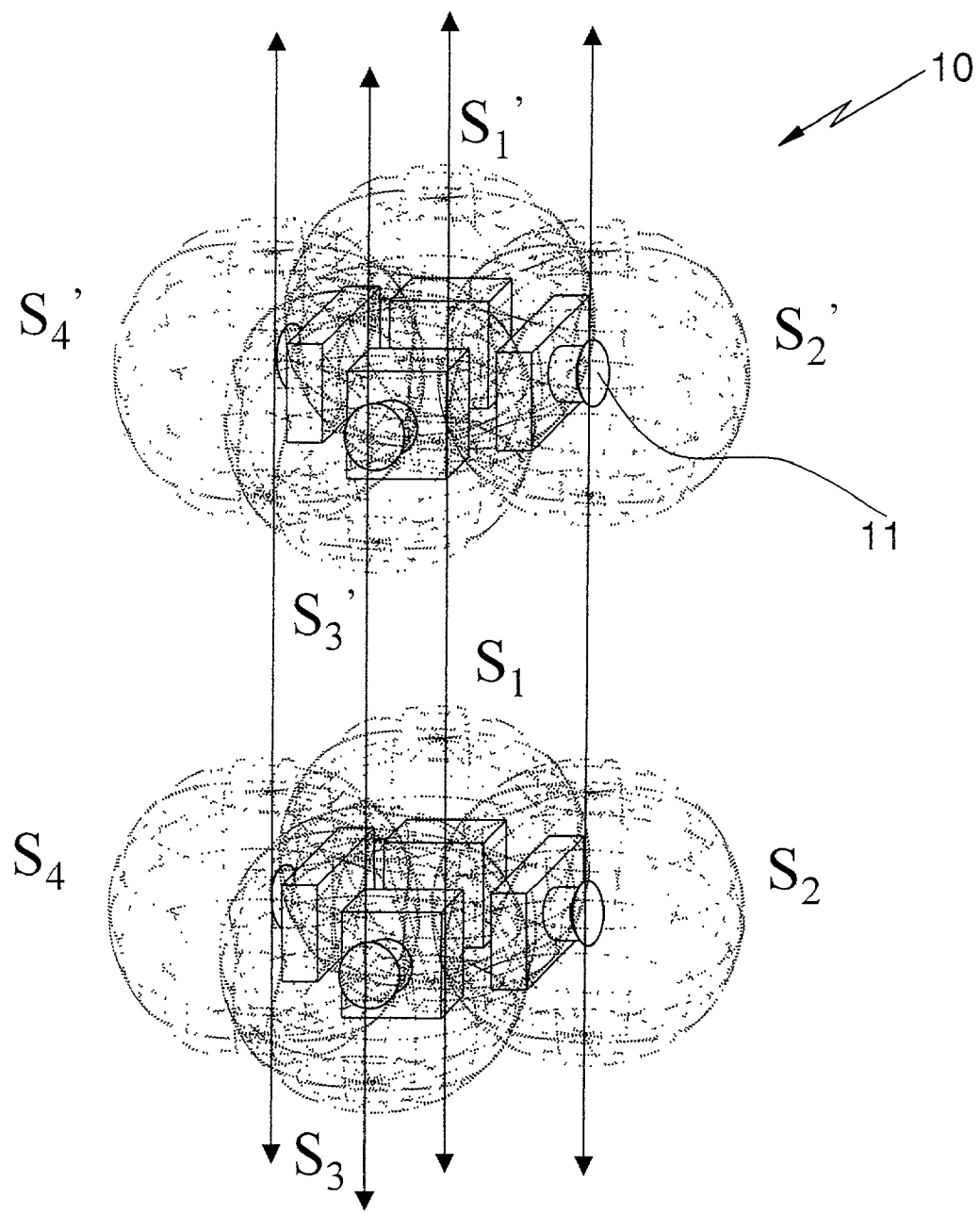
FIG. 12 is a perspective view illustrating two layers of spherical coordinates to apply image processing algorithm according to the present invention.

FIG. 12 is a perspective view illustrating two layers of spherical coordinates to apply image processing algorithm according to the present invention.

This vertical arrangement has advantages in capturing horizontal 360° panorama image that is the natural viewing direction for human with depth information. The spherical coordinates are set to make their axes and connecting line between optical centers of paired two cameras 11 in the direction of height become collinear. This spherical coordinate arrangement has advantage in applying epipolar geometry for searching corresponding points between two images. Longitudinal lines of said spherical coordinate become the epipolar lines for the two images taken from paired two cameras 11.

Figure 13:
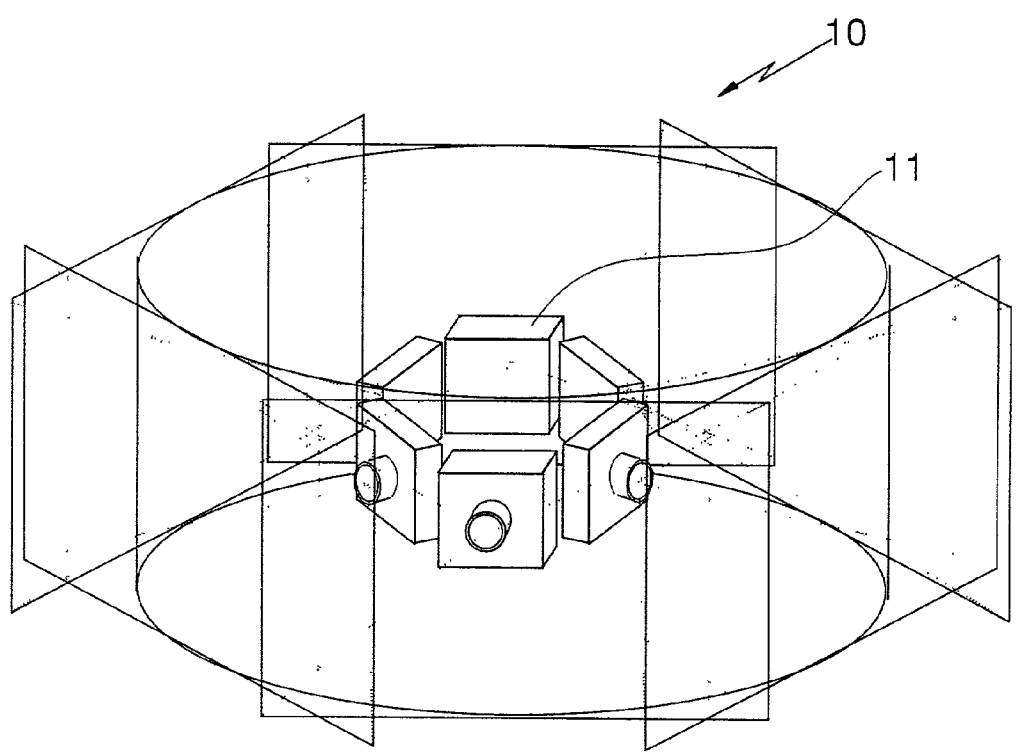
FIG. 13 illustrates a panorama stitching principle by cylindrical projection according to the invention.
Figure 14:
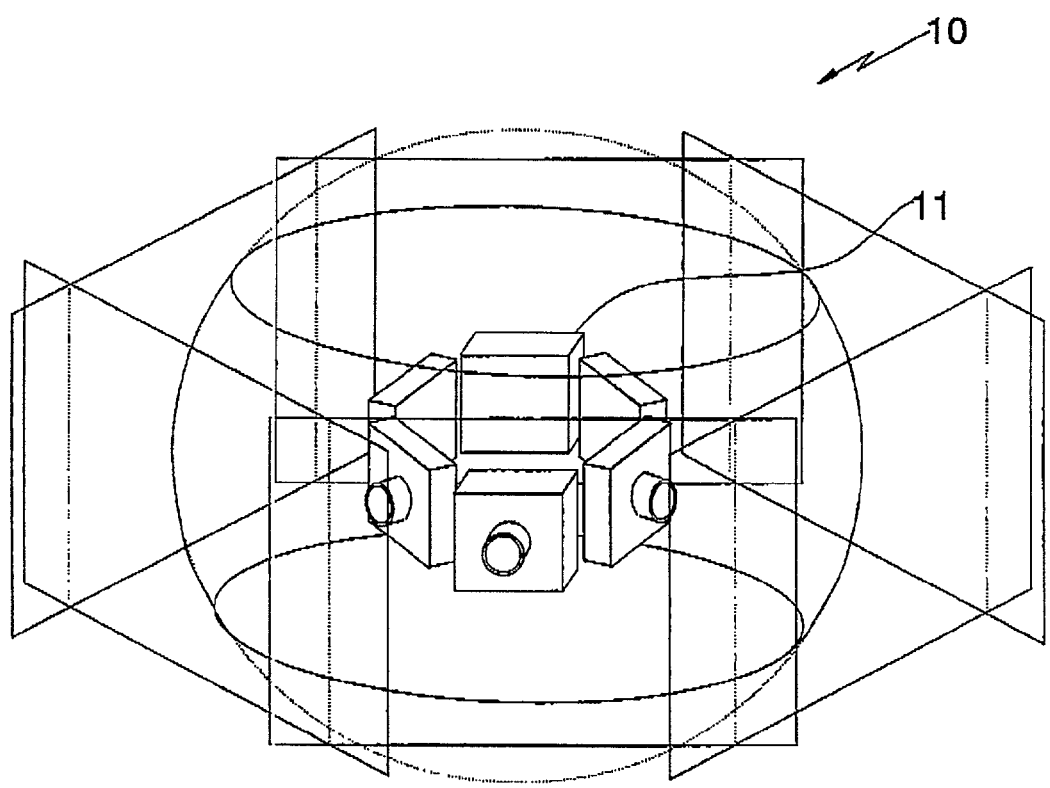
FIG. 14 illustrates a panorama stitching principle by spherical projection according to the invention.

FIG. 13 illustrates a panorama stitching principle by cylindrical projection according to the invention and FIG. 14 illustrates a panorama stitching principle by spherical projection according to the invention. Namely, FIGS. 13 and 14, show an exemplary panorama image generation by cylindrical projection or spherical projection from hexagonal collection of images. Cylindrical or spherical images are mapped onto the surface of cylinder or sphere before it is presented, then the cylinder or sphere is presented to the user as if it is observed from the center of cylinder or sphere through the window of the viewer software on computer monitor. Dotted lines in FIG. 13 show coverage of projection from optical center of each camera 11.

Figure 15:
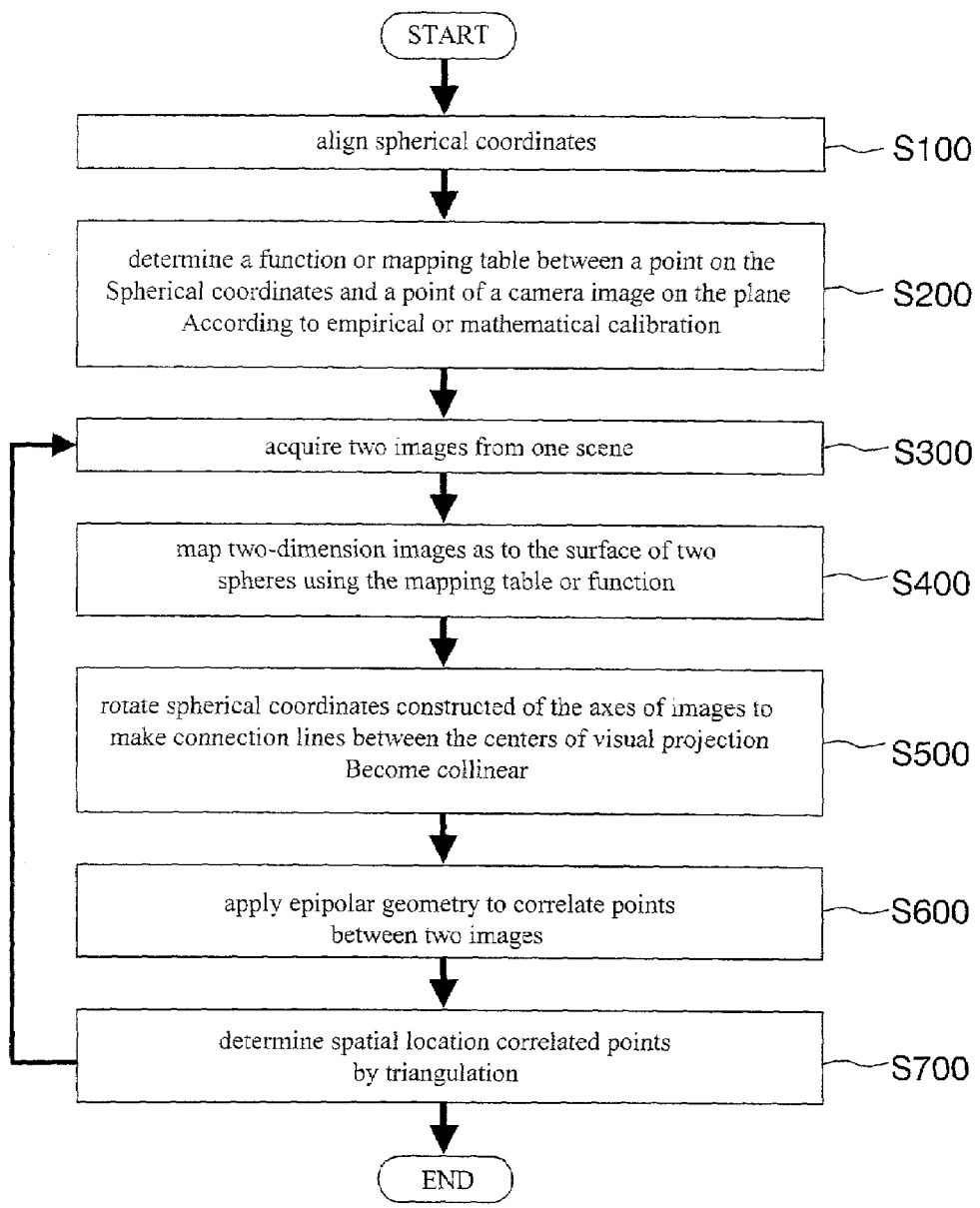
FIG. 15 is a flow diagram illustrating a process of acquiring 3-dimension depth data using epipolar geometry by the omni-directional 3-dimension image data acquisition apparatus according to the invention.

FIG. 15 is a flow diagram illustrating a process of acquiring 3-dimensional depth data using epipolar geometry by the omni-directional 3-dimension image data acquisition apparatus according to the invention. Namely, FIG. 15 shows steps of image data acquisition to 3-dimensional data extraction using the spherical coordinate arrangement and applying epipolar geometry. This method comprising the steps of:

assuming a spherical coordinate where the center of spherical coordinate is set to the projection center of the camera 11 and axis of the spherical coordinate and optical axis of the camera 11 is collinear S100;

finding a mapping table or function between points on the spherical coordinate and points on the image plane of the camera 11 by either empirical or mathematical calibration S200;

acquiring two images of same scene with small displacement between two 2D images acquisition locations S300;

mapping those 2D images to the surfaces of two spheres (or to some data structure to express spheres) using the mapping table or function S400;

rotating said spherical coordinates of those spheres to make their axes and connecting line between optical projection centers of paired cameras 11 become collinear S500;

applying epipolar geometry to correlate points between said two images S600;

determing spatial location of correlated points by triangulation S700; and possibly repeating the steps from S300 to S700 to make more images to possibly acquire.

Figure 16:
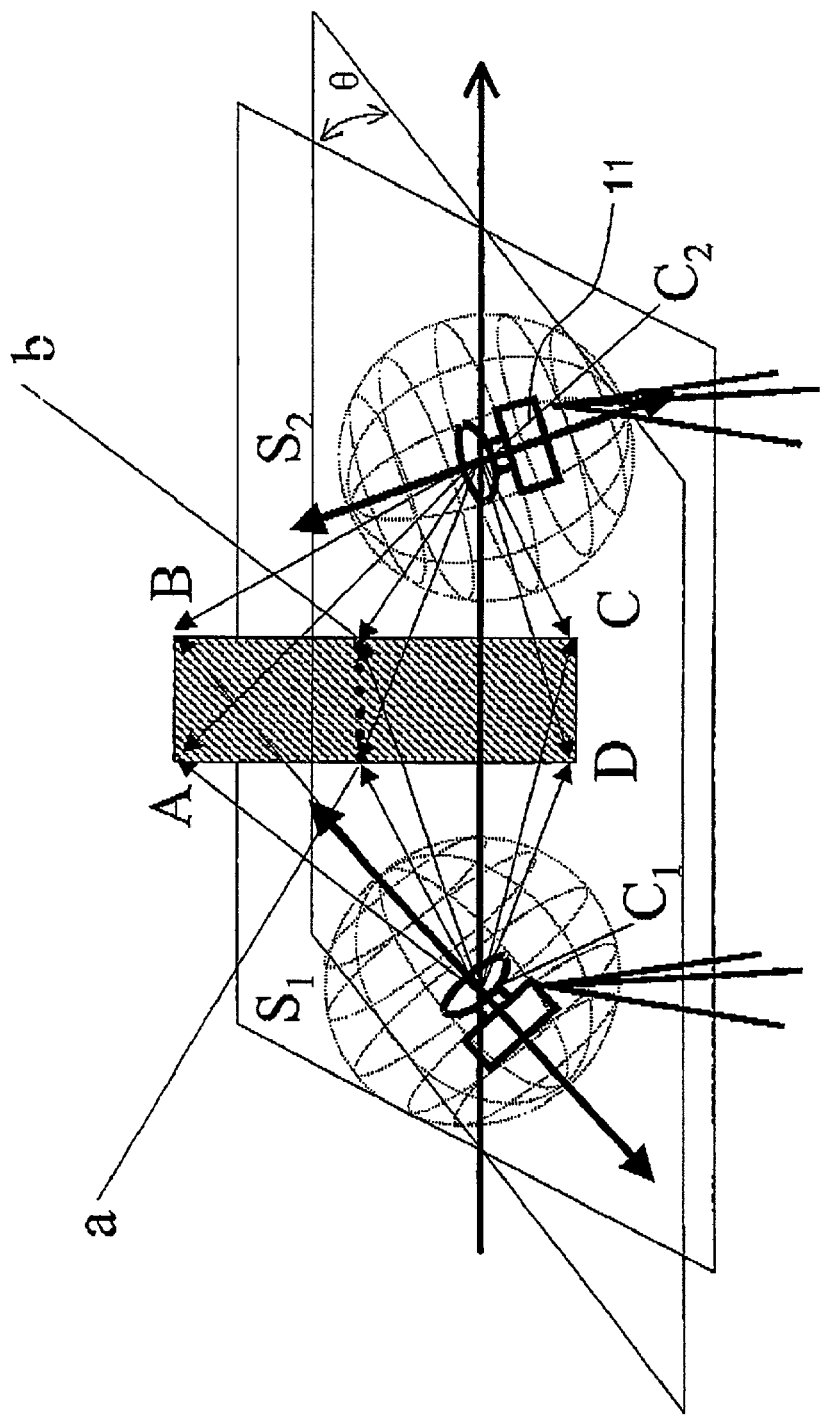
FIG. 16 illustrates the first configuration for showing the principle of obtaining 3-dimensional depth information using spherical coordinate according to the present invention.
Figure 17:
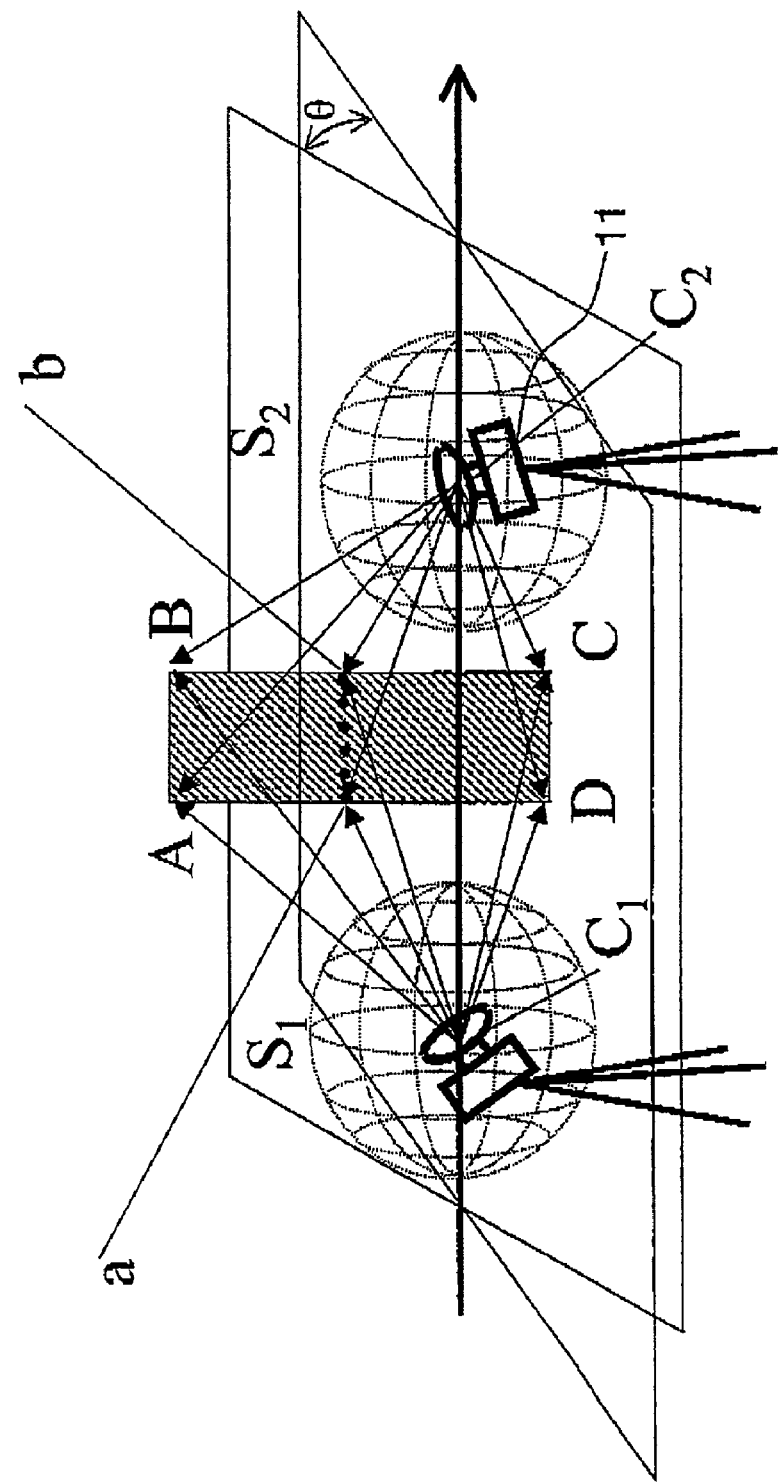
FIG. 17 illustrates the second configuration for showing the principle of obtaining 3-dimensional depth information using rotated and aligned spherical coordinates according to the present invention.

FIG. 16 illustrates the first configuration for showing the principle of obtaining 3-dimensional depth information using spherical coordinate according to the present invention, and FIG. 17 illustrates the second configuration for showing the principle of obtaining 3-dimensional depth information using rotated and aligned spherical coordinates according to the present invention. Namely, FIGS. 16 and 17 illustrate principle of extracting 3-dimensional depth information from two images taken from two cameras 11. Here, the spherical coordinate is set for each camera 11 to the projection center of the camera 11 and axis of the spherical coordinate and optical axis of the camera 11 is collinear and mapping look up table of each camera 11 is calibrated for the said spherical coordinate.

With this initial spherical coordinates, epipolar planes between two pair of cameras 11 are not coplanar to their longitudinal lines of said spherical coordinate. To make the longitudinal lines and epipolar planes are coplanar, coordinate rotation of said spherical coordinate are performed. By applying rotation function to each point, a spherical coordinate can be rotated. Each point on old coordinate is one-to-one mapped to a point on new coordinate.

FIG. 17 illustrates new spherical coordinates set to each camera 11 by coordinate rotation where their centers of coordinates are the center of projection C1 and C2 respectively and epipolar planes and longitudinal lines are coplanar.

Figure 18:
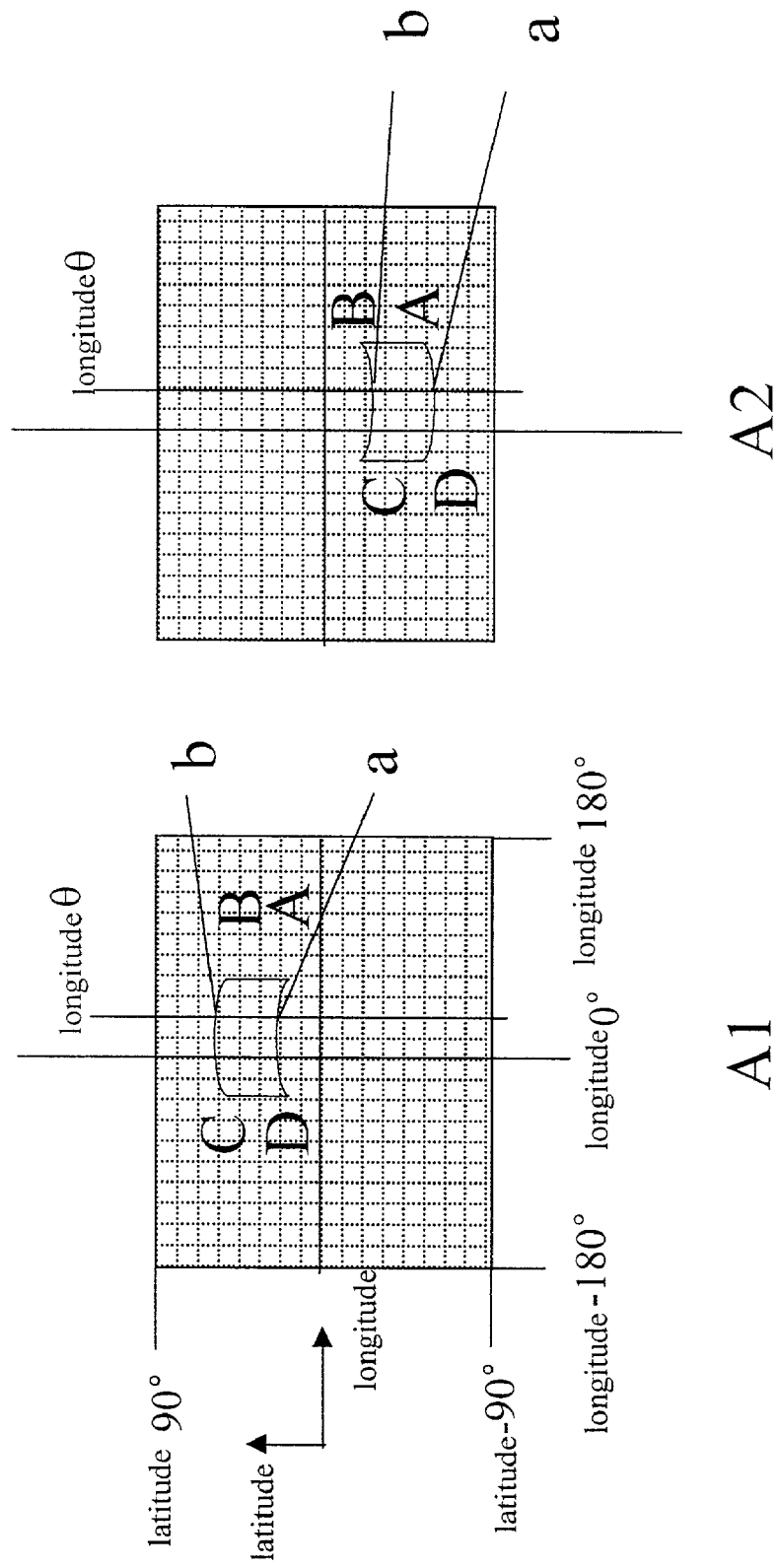
FIG. 18 illustrates a spherical image representation in the form of 2-dimensional data structure according to the present invention in the latitude and longitude.

FIG. 18 illustrates a spherical image representation in the form of 2-dimensional data structure according to the present invention in the latitude and longitude. Namely, FIG. 18 illustrates an exemplary 2-D representation of two spherical images. Here, X-axis represents longitude and Y-axis represents latitude. With this representation, longitudinal lines appear as straight lines parallel to the Y-axis.

This representation can be directly mapped to a two-dimensional array for fast computation. Same epipolar (longitudinal) line can be stored in consecutive block of memory that can be processed faster. When spherical coordinate rotation is performed, each pixel on original 2D array is mapped to other pixel on new 2D array to represent rotated spherical coordinate.

Figure 19:
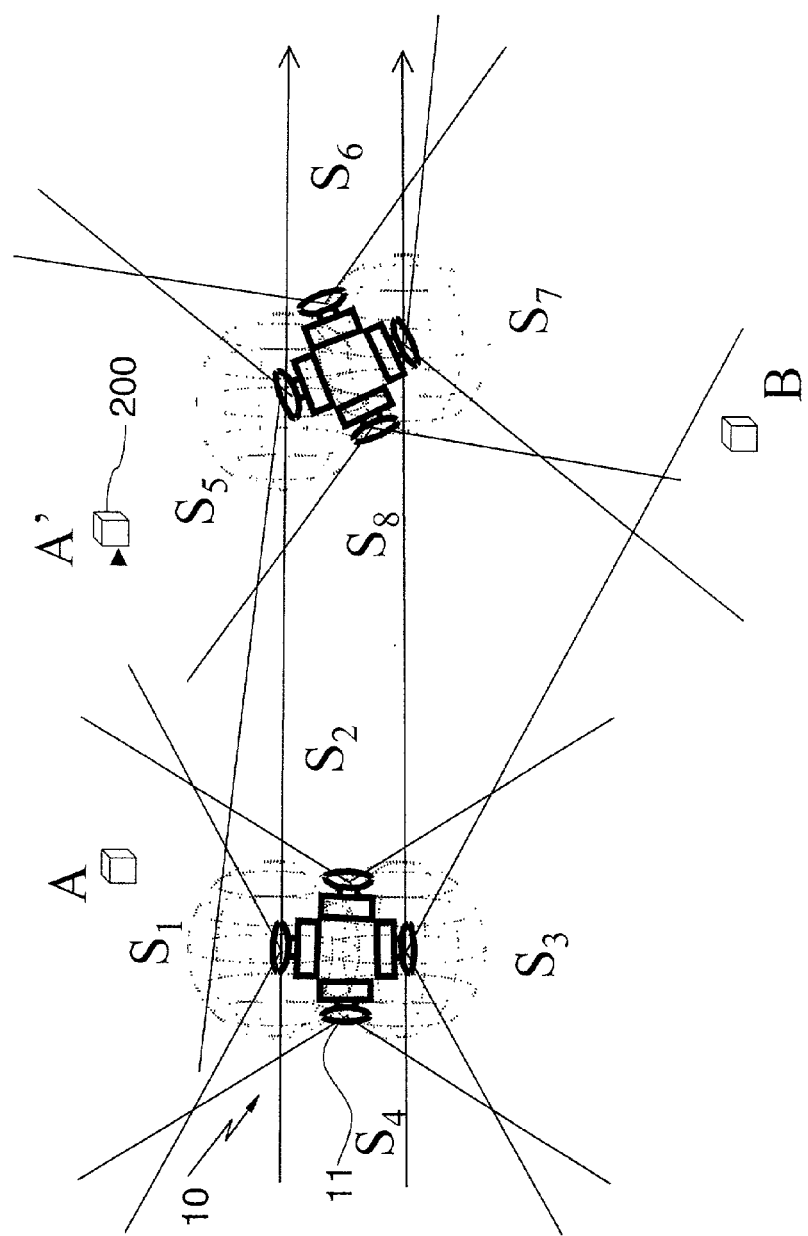
FIG. 19 illustrates the first configuration for showing the principle of obtaining 3-dimensional data acquisition with two sets multiple camera module of four cameras in horizontal arrangement or horizontal displacement according to the present invention.

FIG. 19 illustrates the first configuration for showing the principle of obtaining 3-dimensional data acquisition with two sets multiple camera module 10 of four cameras 11 in horizontal arrangement or horizontal displacement according to the present invention.

To determine 3-dimensional data of object 200 A, cameras 11 $S_1$ and $S_5$ are used. Spherical coordinates of the cameras 11 $S_1$ and $S_5$ are properly rotated to align with their baseline that contains centers of projection for cameras 11 $S_1$ and $S_5$.

To determine 3-dimensional data of object 200 B, cameras 11 $S_3$ and $S_7$ are used. Spherical coordinates of those cameras 11 $S_3$ and $S_7$ are properly rotated to align with their baseline that contains centers of projection for cameras 11 $S_3$ and $S_7$.

If the object 200 A is moving in relation to the multi camera module 10, so that a position of A is moved to other position of A, it is out of coverage of camera 11 $S_1$. In this case, a pair of new cameras 11 $S_2$ and $S_5$ can be used to trace movement of the object 200 A so that object 200 tracking can be seamless. This is another novel advantage of this omni-directional camera system with multi camera module 10.

Figure 20:
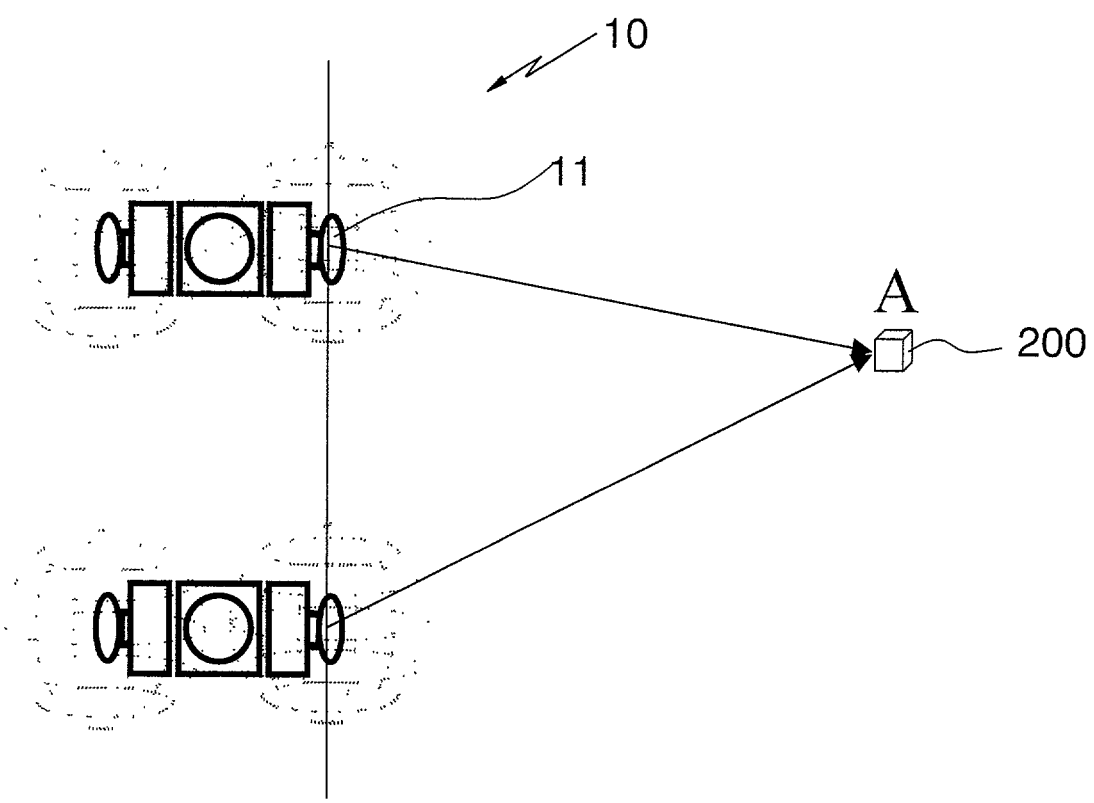
FIG. 20 illustrates the second configuration for showing the principle of obtaining 3-dimensional data acquisition with 2 layers of multiple camera module set in vertical arrangement or vertical displacement according to the present invention.

FIG. 20 illustrates the second configuration for showing the principle of obtaining 3-dimensional data acquisition with 2 layers of multi camera module 10 set in vertical arrangement or vertical displacement according to the present invention. As shown in FIG. 20, the omni-directional camera system comprises two sets or layers of multi camera module 10 each of which includes four cameras 11 in vertical arrangement or displacement.

Baseline and distance between two cameras 11 are fixed. Spherical coordinates are set so that their centers of coordinates are the optical projection centers of each camera 11 and epipolar planes and longitudinal lines are coplanar. This coordinate arrangement has advantage in epipolar line searching because longitudinal lines become the epipolar lines. Depth information to object 200 A can be calculated from photographing angle difference of object 200 A between two spherical coordinates.

Figure 21:
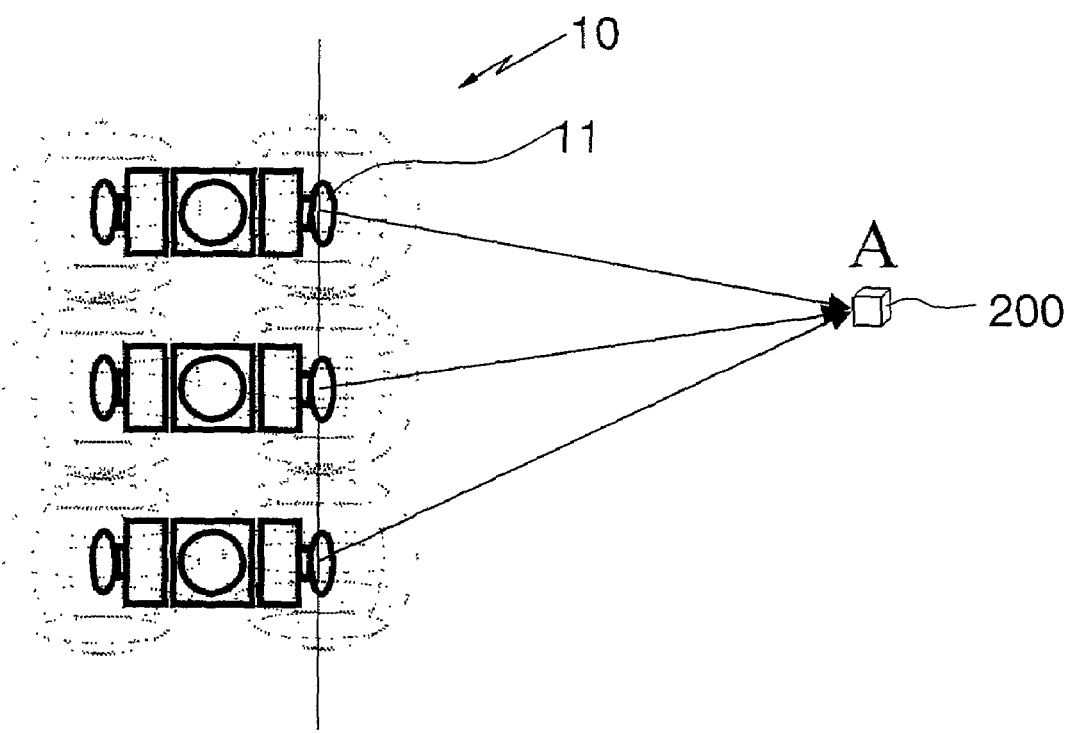
FIG. 21 illustrates the third configuration for showing the principle of obtaining 3-dimensional data acquisition with 3 layers of multiple camera module set in vertical arrangement or vertical displacement according to the present invention.

FIG. 21 illustrates the third configuration for showing the principle of obtaining 3-dimensional data acquisition with 3 layers of multi camera module 10 set in vertical arrangement or vertical displacement according to the present invention. As shown in FIG. 21, the omni-directional camera system comprises three sets or layers of multi camera module 10 each of which includes four cameras 11 in vertical arrangement or displacement.

Method of calculating distance is same as two cameras 11 case but three cameras 11 provide more accurate distance information because their disparity of two adjacent images could be smaller while longest baseline distance could be same or bigger than two-camera system.

In distance calculation between 2 images, feature point matching is more accurate if disparity amount is smaller, which comes with small baseline distance of cameras 11.

But small camera 11 distance increases inaccuracy in distance calculation because even small error in disparity detection produces large amount of depth error. Array of three cameras 11 reduces disparity amount between two adjacent images so that point matching can be more accurate while maintaining same longest baseline distance as two-camera system.

Figure 22:
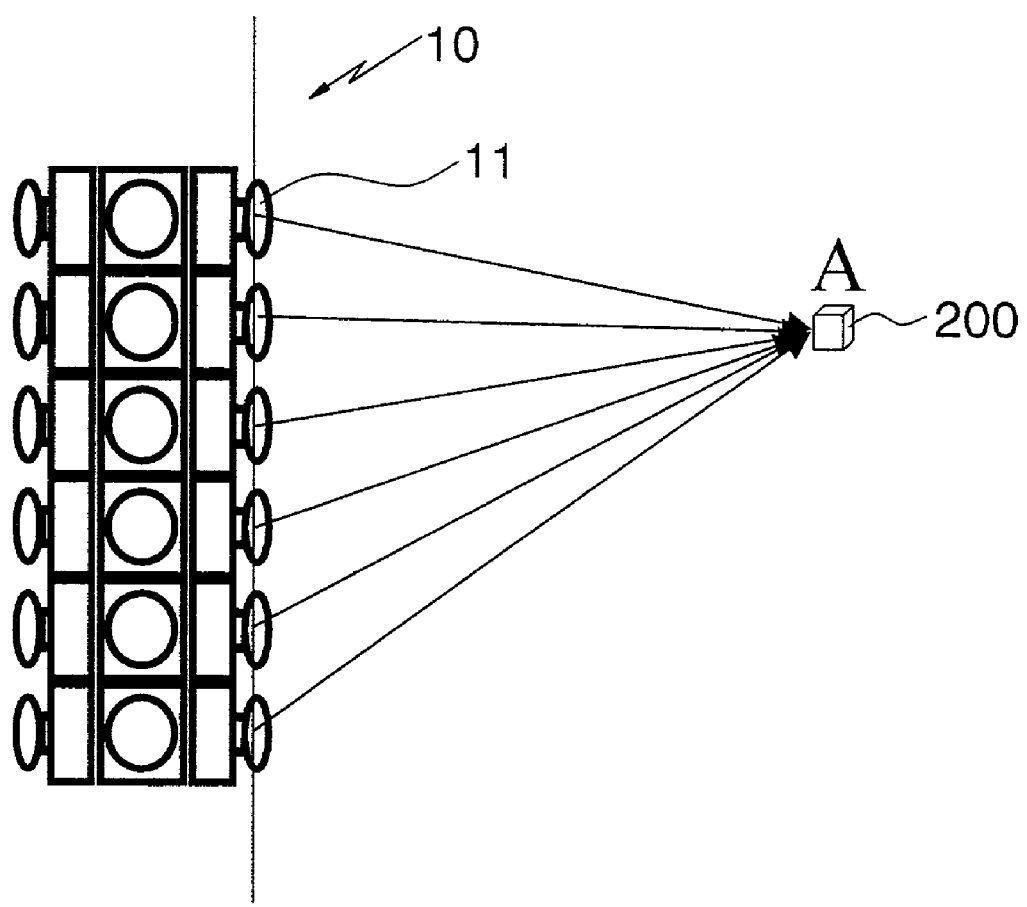
FIG. 22 illustrates the fourth configuration for showing the principle of obtaining 3-dimensional data acquisition with 6 layers of multiple cameras set in vertical arrangement or vertical displacement according to the present invention.

FIG. 22 illustrates the fourth configuration for showing the principle of obtaining 3-dimensional data acquisition with 6 layers of multi camera module set in vertical arrangement or vertical displacement according to the present invention. As shown in FIG. 22, the omni-directional camera system comprises six sets of multi camera module 10 each of which includes four cameras in vertical arrangement or displacement.

By increasing the number of multi camera module 10, the system can increase maximum baseline distance without increasing disparity amount of adjacent images. Also, images from multiple cameras 11 produce optical flow of an object 200 that can be used to determine depth of the object 200.

FIGS. 23 to 27 illustrate 3-dimensional sensing principle from optical flow acquired by array of cameras 11.

Figure 23:
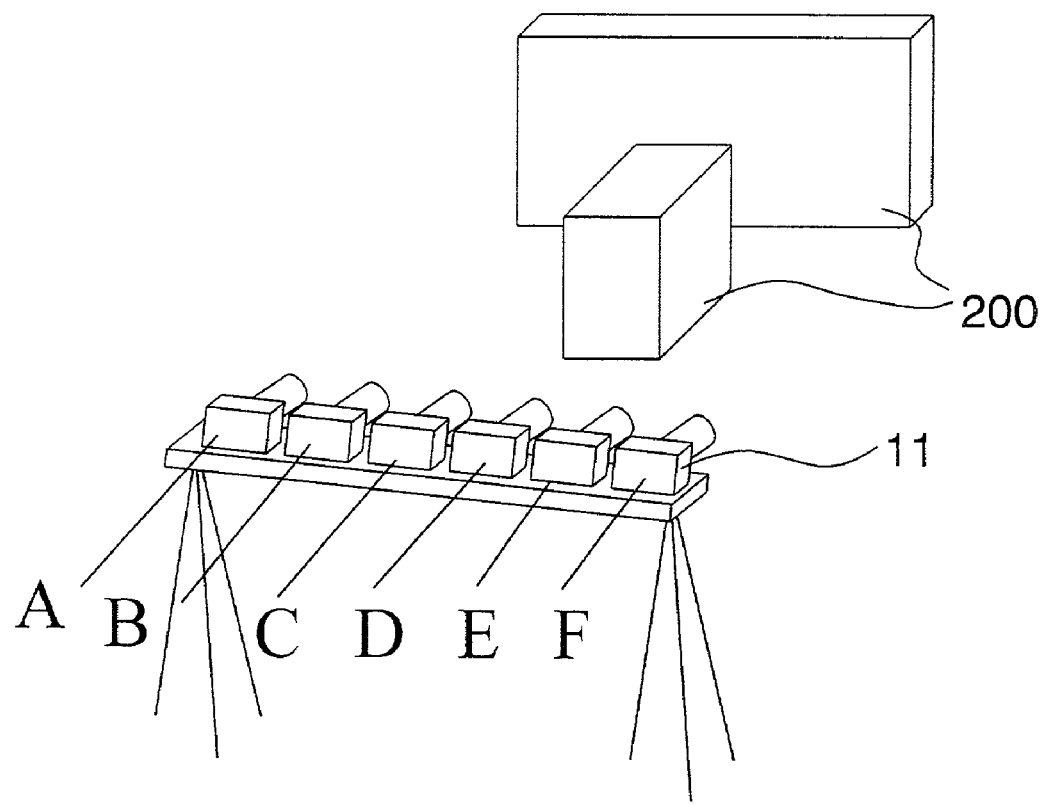
FIG. 23 illustrates exemplary setting of the multi-camera module to explain 3-dimensional data acquisition using optical flow according to the present invention.

FIG. 23 illustrates exemplary setting of the multi-camera module to explain 3-dimensional data acquisition using optical flow according to the present invention. Namely, FIG. 23 shows exemplary setting of objects 200 and cameras 11 to explain the principle. The cameras 11 are arranged linearly and their poses are same and their optical centers reside on a same baseline.

Figure 24:
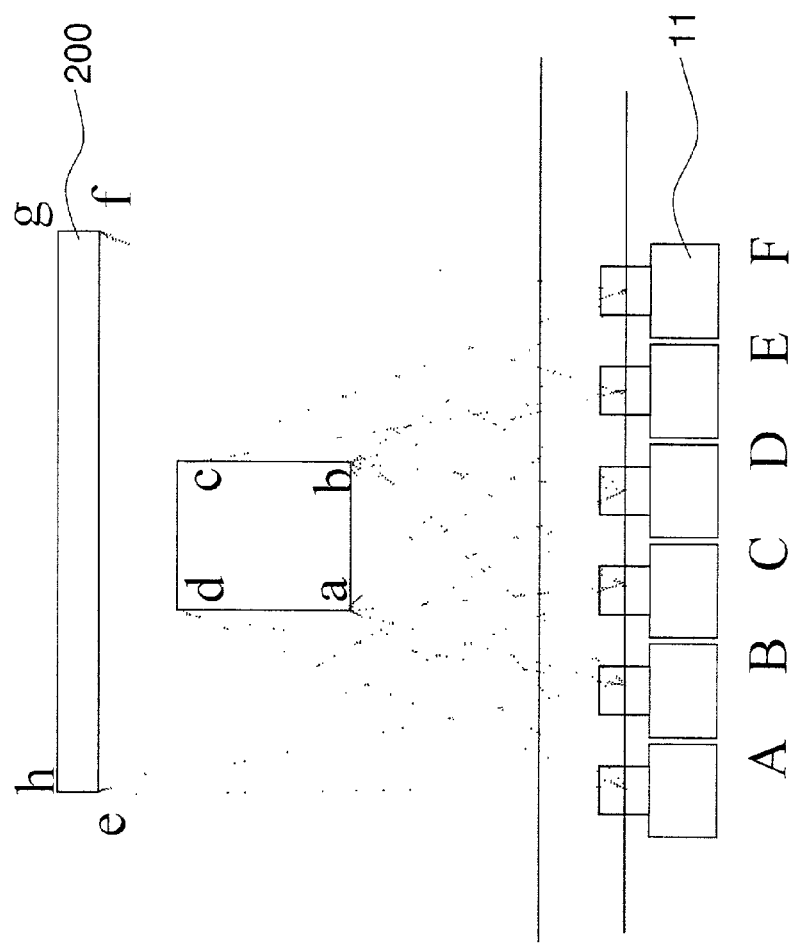
FIG. 24 illustrates specific points to which an object corresponds when the multiple camera module photograph the object according to the present invention.

FIG. 24 illustrates specific points to which an object corresponds when the multiple camera module photograph the object according to the present invention. Namely, FIG. 24 illustrates viewing direction of several feature points on the objects 200 from each camera 11. For example, viewing direction to point a from cameras 11 A to F changes gradually from right to left.

Figure 25:
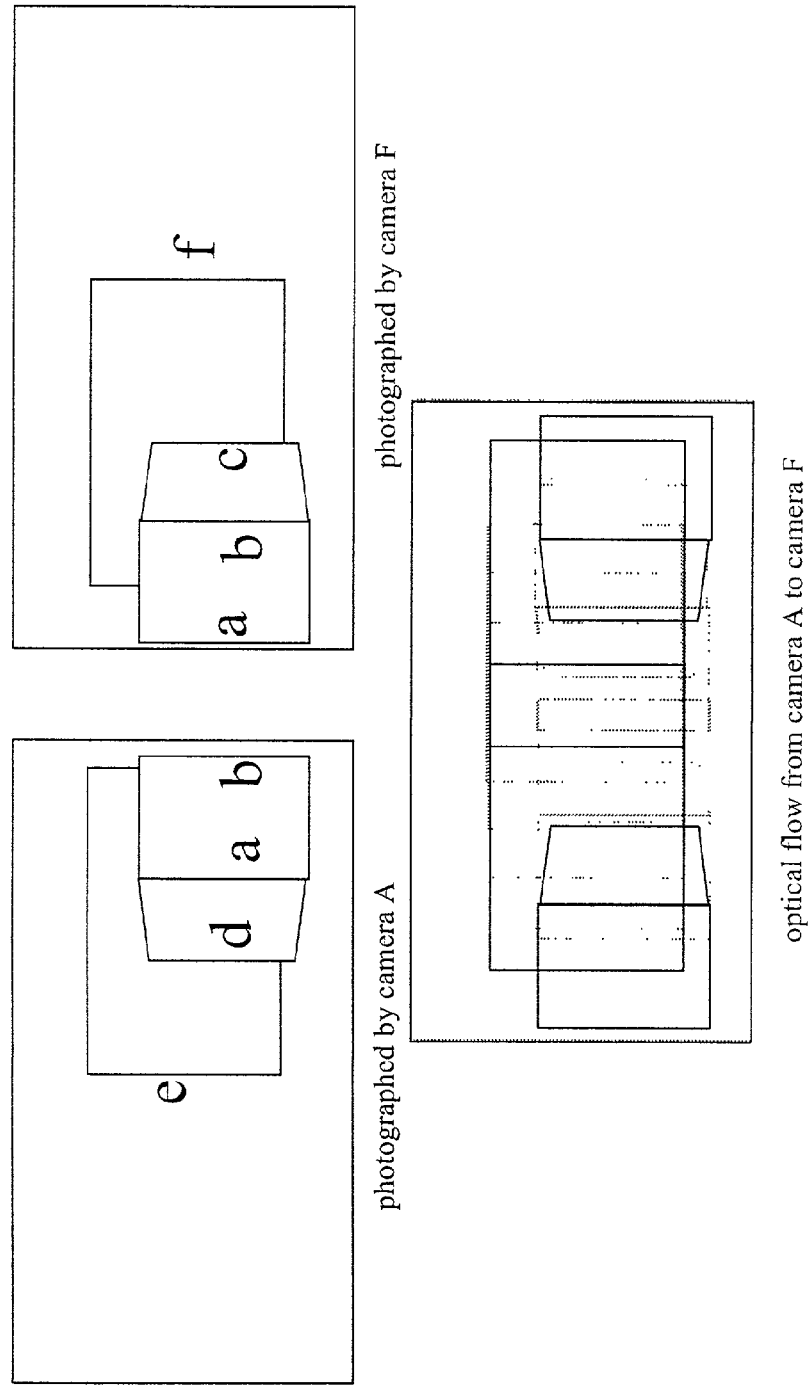
FIG. 25 illustrates optical flow by images acquired by the multiple camera module according to the present invention.

FIG. 25 illustrates optical flow by images acquired by the multiple camera module according to the present invention. Namely, FIG. 25 illustrates optical flow of objects 200 on images taken from cameras 11 A to F. Images taken from cameras 11 A and F are quite different, but intermediate images taken from cameras 11 B to E show optical flow of objects from cameras 11 A to F.

Figure 26:
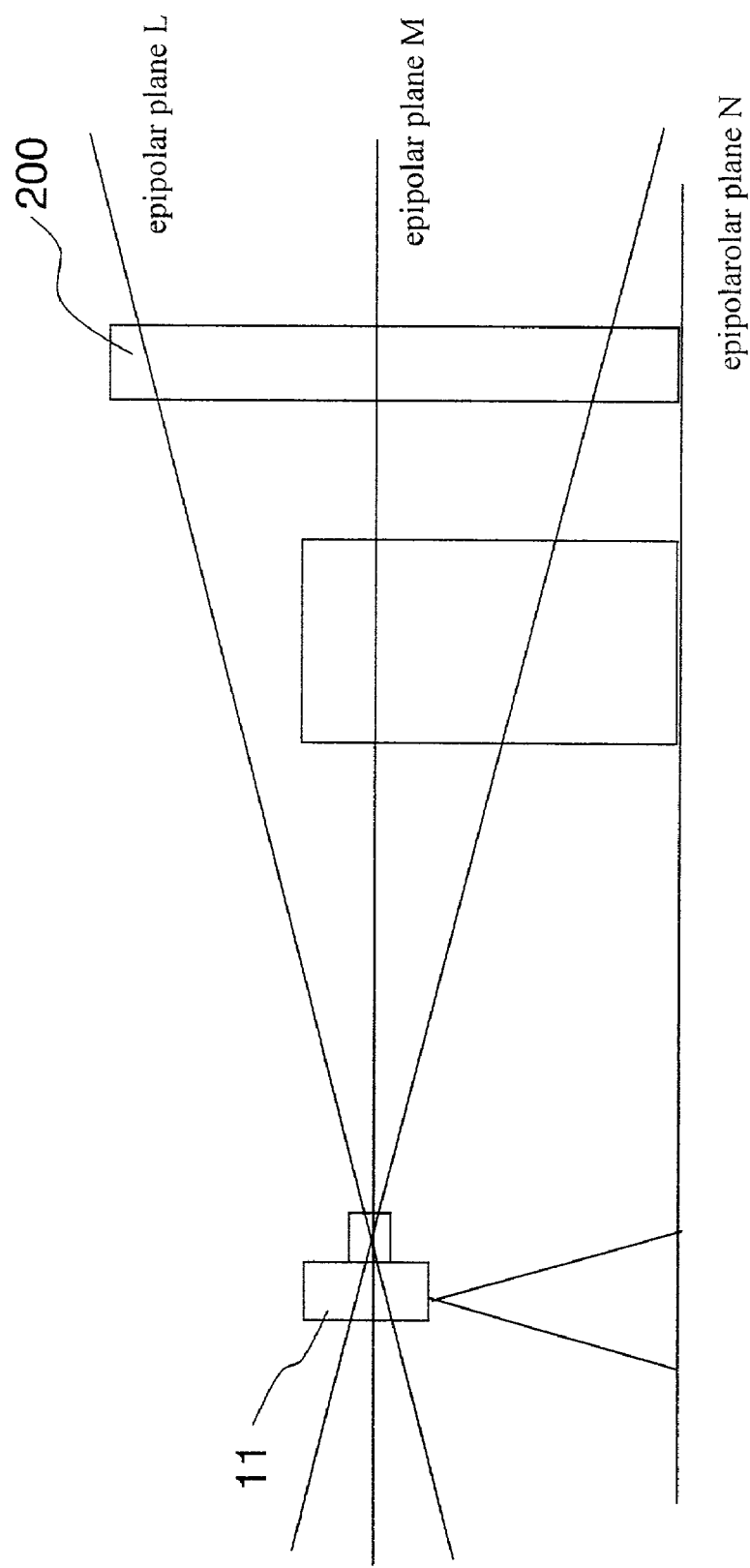
FIG. 26 illustrates epipolar planes between photographed objects and set of the multiple camera module according to the present invention.

FIG. 26 illustrates epipolar planes between photographed objects and set of the multiple camera modules according to the present invention. Namely, FIG. 26 illustrates several epipolar planes for the array of cameras 11.

As shown in FIG. 26, if spherical coordinate for each camera 11 is set such as illustrated in FIG. 22, these epipolar planes are coplanar to corresponding longitudinal lines. Feature point matching is searched along the epipolar lines, which are longitudinal lines of the spherical coordinate.

FIG. 27 illustrates the depth effect on the slope of optical flow by the multiple camera module with respect to an epipolar plane according to the present invention. Namely, FIG. 27 illustrates an exemplary optical flow for an epipolar plane M from images taken from cameras 11 A to F to show the effect of distance of objects 200 to the optical flow.

Closer objects 200 make steeper slopes while farther objects 200 make gradual slopes. It also shows occlusion of point (c, d) by region between point (a, b). Gradient of the slope determines depth of the object 200.

FIG. 28 is a perspective view illustrating a principle of acquiring 3 dimension data for a specific feature point by displacement of the omni-directional 3-dimension image data acquisition apparatus of the present invention. Namely, FIG. 28 illustrates 3-dimensional data acquisition principle in mobile omni-directional camera system. For example, this mobile system can be used to acquire spatial information for urban 3-dimensional modeling.

The displacement of omni-directional camera system can be determined by counting wheel rotation and direction change of the vehicle. Change in angular distance of viewing direction of the tracked feature point and displacement of camera system between two locations can determine location of the feature point by applying trigonometry. Spatial location of the tracked feature point can also be determined by disparity in the images of vertically arranged cameras 11. These redundant sources of depth information increase accuracy of 3-dimensional data acquisition.

FIG. 29 illustrates a principle of feature tracking of an object when the omni-directional 3-dimension image data acquisition apparatus of the invention photographs the object while moving. Namely, FIG. 29 illustrates principle of 3-dimensional data acquisition in urban environment. Urban structures are mostly consisting vertical rectangular planes, and lines are mostly vertical or horizontal.

If a rectangular plane is assumed in one location, it can be traced along with the displacement of mobile omni-directional camera system. This is faster method than tracing each feature point. Once location and pose of a rectangular plane is determined, the information about the location and pose of the rectangular plane can also be used to determine camera 11 locations and poses of other images also including the rectangular plane.

As mentioned above, in the method and apparatus for omni-directional image and 3-dimensional data acquisition with data annotation and dynamic range extension method according to the present invention, the number of the cameras 11 installed on one multi camera module 10 is variably due to their volume, even though the number of the cameras 11 in the preferred embodiments is 4 to 5. In addition, the number of the sets or layers of the multi camera module 10 is variable according as the user desired. Namely, the multi camera module 10 can be vertically stacked with one layer or more layers.

Therefore, the method and apparatus for omni-directional image and 3-dimensional data acquisition can omni-directionally photograph one object and more objects and acquire 3-dimensional image data thereof. Also, the method and apparatus can extend dynamic range of the image by composing the acquired image data from a plurality of the camera 11 of one or more multi camera module(s) 10, which has different exposure amount each other.

Further, the method and apparatus associate the acquired image data with annotation data such as a photographing location and a photographing time and generate a geographical information which may be connected with other geographical information generated in other geographical information system database and which may be used in other geographical information system.

The apparatus can be installed a mobile means so that it can continuously photograph an object while moving.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

We claim:

1. An omni-directional image and 3-Dimensional data acquisition apparatus, comprising:
   a plurality of multi-camera modules, each multi-camera module constructed in a manner comprising a plurality of cameras that are symmetrically arranged with a specific point in a plane, each of the cameras taking charge of each of divided angles such that each multi-camera module can take an omni-directional continuous panoramic photograph of surrounding objects with the specific point;
   first frame grabbers each of which is electrically connected to each of the cameras of each multi-camera module, to grab photographed images by frames;
   an exposure calculator electrically connected to the first frame grabbers, to calculate exposure of each camera, based on the grabbed images by frames;
   an exposure signal generator electrically connected to each camera, to transmit information about the exposure as a signal on the basis of the exposure calculated by the exposure calculator;

storage means electrically connected to the each first frame grabber, to store images photographed by the cameras according to photographing location and photographing time;

a video camera electrically connected to the storage means via a second frame grabber for grabbing photographed moving pictures by frames, to the storage means a unique video clip corresponding to each image or image group to be stored in the storage means;

a GPS sensor to sense the photographing location and photographing time;

an annotation entering unit electrically connected to the GPS sensor to calculate location and time corresponding to each frame based on sensed data of the GPS sensor, the annotation entering unit being electrically connected to the storage means to enter the calculated location and time in each frame as annotation; and a trigger signal generator electrically connected the storage means, the exposure signal generator, the annotation entering unit, the trigger signal generator selectively transmits a trigger signal to the exposure signal generator or the annotation entering unit in order that the cameras start to photograph the objects according to the trigger signal; and wherein the multi-camera modules are vertically stacked and formed in at least two layers in the direction of height.

2. The apparatus as claimed in claim 1, further comprising a plurality of light intensity sensors electrically connected to the exposure calculator to allow the exposure calculator to be able to calculate the exposure amount of each camera based on external light intensity.

3. The apparatus as claimed in claim 1, wherein the storage means is one of digital storage devices comprised of a hard disk, compact disk, magnetic tape and memory.

4. The apparatus as claimed in claim 1, further comprising an audio digital converter electrically connected to the storage means, the audio digital converter converting an audio signal sensed by an audio sensor into a digital signal as an audio clip to correspondingly attach to each image or image group to be stored in the storage means.

5. The apparatus as claimed in claim 1, further comprising mobile means, on which the multi-camera modules are mounted, to enable continuous panoramic photographing while moving.

6. The apparatus as claimed in claim 1, further comprising a distance sensor and a direction sensor for respectively sensing the distance and direction of the image photographed by each camera.

7. An omni-directional image and 3-Dimensional data acquisition apparatus, comprising:

a plurality of multi-camera modules, each multi-camera module constructed in a manner comprising a plurality of cameras that are symmetrically arranged with a specific point in a plane, each of the cameras taking charge of each of divided angles such that each multi-camera module can take an omni-directional continuous panoramic photograph of surrounding objects with the specific point;

first frame grabbers each of which is electrically connected to each of the cameras of each multi-camera module, to grab photographed images by frames;

an exposure calculator electrically connected to the first frame grabbers, to calculate exposure of each camera, based on the grabbed images by frames;

an exposure signal generator electrically connected to each camera, to transmit information about the exposure as a signal on the basis of the exposure calculated by the exposure calculator;

storage means electrically connected to the each first frame grabber, to store images photographed by the cameras according to photographing location and photographing time;

a distance sensor and a direction sensor for respectively sensing the distance and direction of the image photographed by each camera;

a GPS sensor to sense the photographing location and photographing time;

an annotation entering unit electrically connected to the GPS sensor to calculate location and time corresponding to each frame based on sensed data of the GPS sensor, the annotation entering unit being electrically connected to the storage means to enter the calculated location and time in each frame as annotation; and a trigger signal generator electrically connected the storage means, the exposure signal generator, the annotation entering unit, the trigger signal generator selectively transmits a trigger signal to the exposure signal generator or the annotation entering unit in order that the cameras start to photograph the objects according to the trigger signal; and wherein the multi-camera modules are vertically stacked and formed in at least two layers in the direction of height.

8. The apparatus as claimed in claim 7, further comprising a plurality of light intensity sensors electrically connected to the exposure calculator to allow the exposure calculator to be able to calculate the exposure amount of each camera based on external light intensity.

9. The apparatus as claimed in claim 7, wherein the storage means is one of digital storage devices comprised of a hard disk, compact disk, magnetic tape and memory.

10. The apparatus as claimed in claim 7, further comprising an audio digital converter electrically connected to the storage means, the audio digital converter converting an audio signal sensed by an audio sensor into a digital signal as an audio clip to correspondingly attach to each image or image group to be stored in the storage means.

11. The apparatus as claimed in claim 7, further comprising a video camera electrically connected to the storage means via a second frame grabber for grabbing photographed moving pictures by frames, to the storage means a unique video clip corresponding to each image or image group to be stored in the storage means.

12. The apparatus as claimed in claim 7, further comprising mobile means, on which the multi-camera modules are mounted, to enable continuous panoramic photographing while moving.

* * * * *